(12) United States Patent
Kubota et al.

(10) Patent No.: US 10,393,547 B2
(45) Date of Patent: Aug. 27, 2019

(54) POSITION DETECTION SYSTEM, POSITION DETECTION METHOD, IMAGE GENERATION UNIT AND IMAGE PROJECTION APPARATUS

(71) Applicants: Hiroyuki Kubota, Kanagawa (JP); Akihisa Mikawa, Kanagawa (JP)

(72) Inventors: Hiroyuki Kubota, Kanagawa (JP); Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 15/647,368

(22) Filed: Jul. 12, 2017

(65) Prior Publication Data

US 2018/0023976 A1    Jan. 25, 2018

(30) Foreign Application Priority Data

Jul. 22, 2016   (JP) .................................. 2016-144155

(51) Int. Cl.
*G01D 5/14* (2006.01)

(52) U.S. Cl.
CPC ............. *G01D 5/142* (2013.01); *G01D 5/145* (2013.01)

(58) Field of Classification Search
CPC .................................. G01D 5/142; G01D 5/145
See application file for complete search history.

(56) References Cited

U.S. PATENT DOCUMENTS

| | | |
|---|---|---|
| 5,285,313 A | 2/1994 | Kobayashi et al. |
| 2005/0050569 A1 | 3/2005 | Yamanaka et al. |
| 2006/0284495 A1 | 12/2006 | Seo et al. |
| 2007/0091181 A1 | 4/2007 | Serikawa et al. |
| 2009/0039875 A1 | 2/2009 | Hoshino |
| 2010/0033820 A1 | 2/2010 | Omi |
| 2011/0019157 A1 | 1/2011 | He |
| 2014/0036239 A1 | 2/2014 | Mashitani |
| 2015/0219983 A1 | 8/2015 | Mashitani et al. |
| 2015/0264291 A1 | 9/2015 | Tani et al. |
| 2016/0154294 A1 | 6/2016 | Fujioka et al. |

(Continued)

FOREIGN PATENT DOCUMENTS

| | | |
|---|---|---|
| JP | 4-031835 | 2/1992 |
| JP | 405316414 A | * 11/1993 |
| JP | 2001-350196 | 12/2001 |

(Continued)

*Primary Examiner* — Daniel R Miller
(74) *Attorney, Agent, or Firm* — Oblon, McClelland, Maier & Neustadt, L.L.P.

(57) ABSTRACT

A position detection system includes a magnetic field generation unit to generate a magnetic field, a magnetic field detection unit to detect a magnetic flux density of the magnetic field effecting from the magnetic field generation unit, and to output a detection voltage corresponding to the detected magnetic flux density, and circuitry to amplify the detection voltage, set a reference voltage for amplifying the detection voltage, and an amplification level of the detection voltage based on at least one of a voltage input to the magnetic field detection unit and a gain value set for the amplification of the detection voltage or both of the voltage input to the magnetic field detection unit and the gain value set for the amplification of the detection voltage, and change the reference voltage to switch a region used for detecting a position of a movable member.

9 Claims, 23 Drawing Sheets

(56) References Cited

U.S. PATENT DOCUMENTS

2016/0198134 A1    7/2016  Mikawa et al.

FOREIGN PATENT DOCUMENTS

| JP | 2008-070494 | 3/2008 |
| JP | 2008-225158 | 9/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 2013-117629 | 6/2013 |
| JP | 2016-102945 | 6/2016 |
| JP | 2016-102946 | 6/2016 |
| WO | WO2016/067519 A1 | 5/2016 |

* cited by examiner

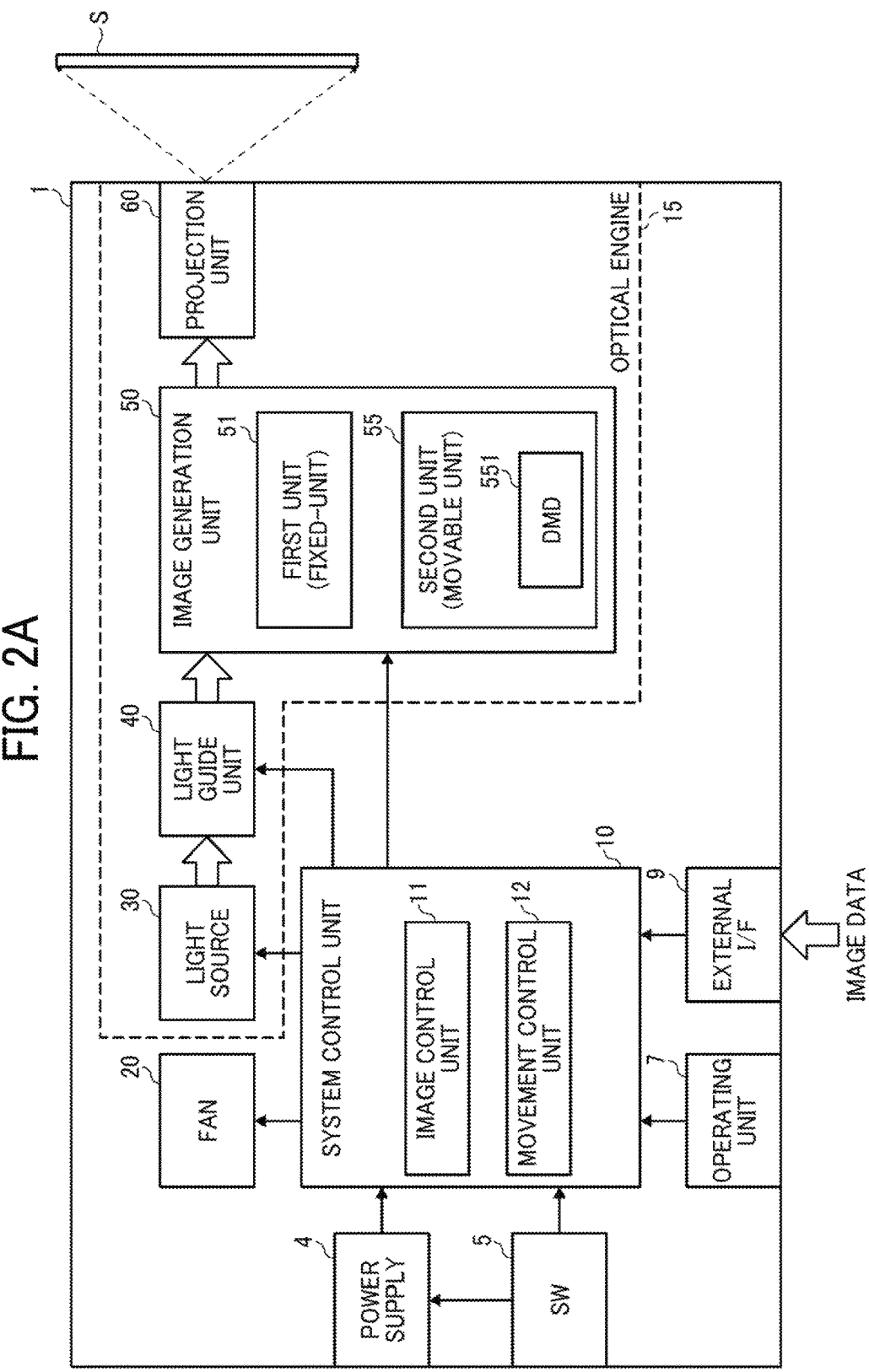

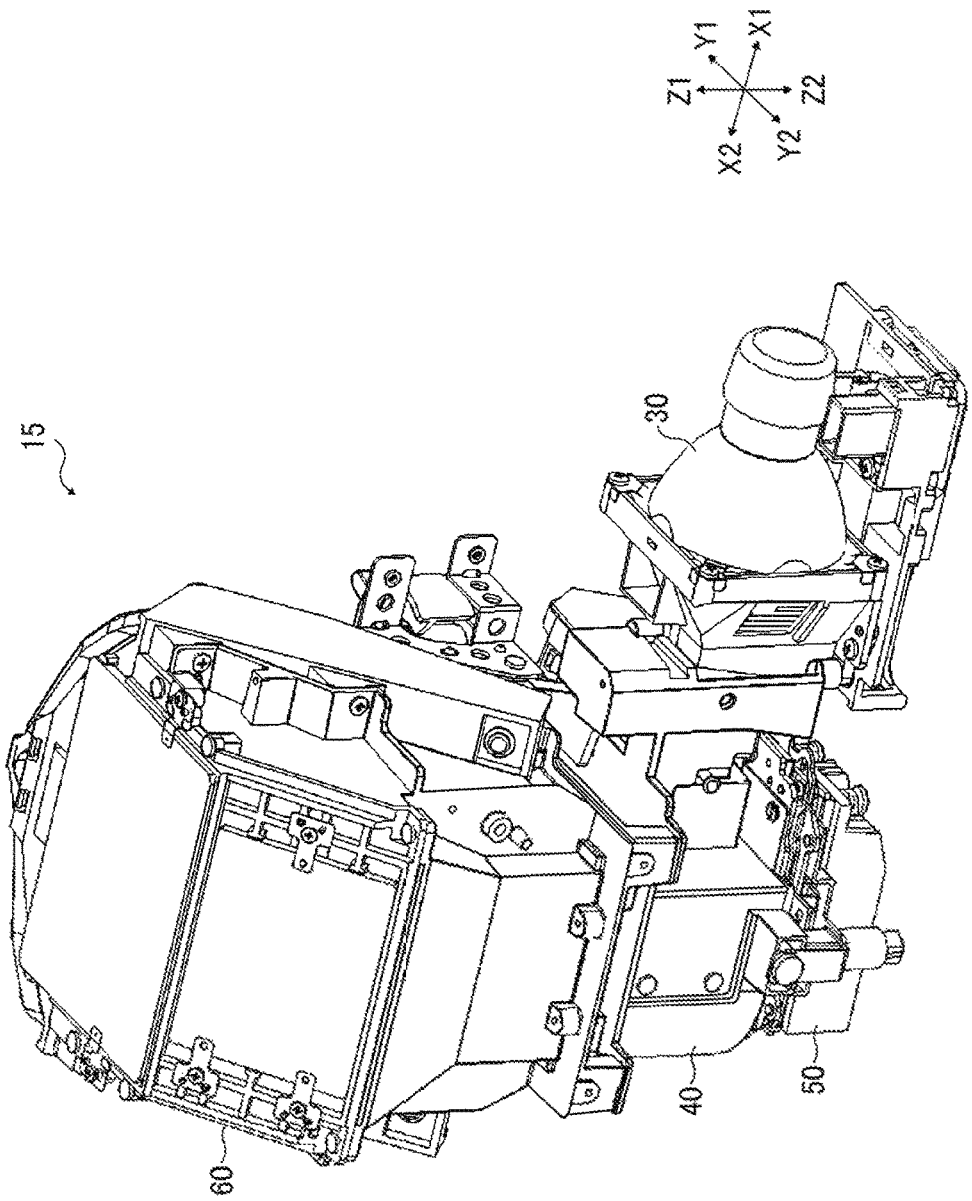

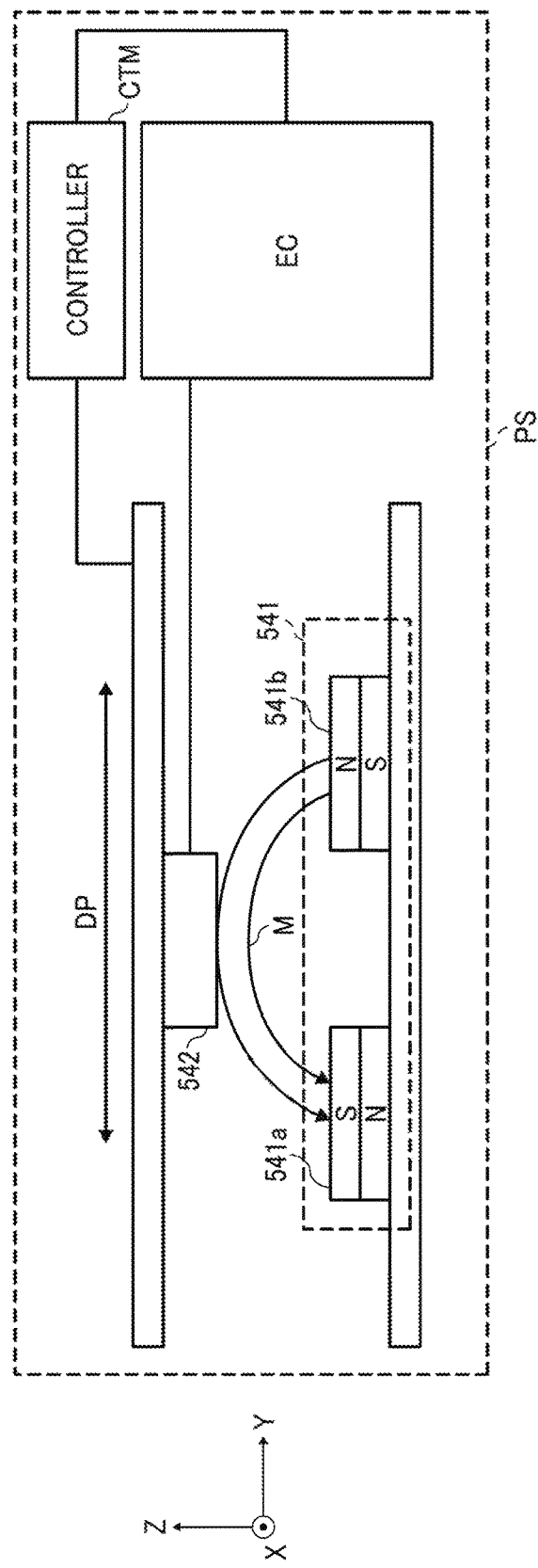

POSITION DETECTION SYSTEM, POSITION DETECTION METHOD, IMAGE GENERATION UNIT AND IMAGE PROJECTION APPARATUS

CROSS-REFERENCE TO RELATED APPLICATION

This application claims priority pursuant to 35 U.S.C. § 119(a) to Japanese Patent Application No. 2016-144155 filed on Jul. 22, 2016 in the Japan Patent Office, the disclosure of which is incorporated by reference herein in its entirety.

BACKGROUND

Technical Field

This disclosure relates to a position detection system, a position detection method, an image generation unit, and an image projection apparatus.

Background Art

A method of detecting a position of a movable member by using a magnetic field generating member such as a Hall element known as a Hall sensor is available.

When the position is detected by using a position detection system, at first, it is determined whether a swing angle around the x-axis of a movable member is near the center of the movement. If it is determined that the swing angle is near the center of the movement, an output of a sensor is input to an analog-digital converter via an amplifier, with which a control in the vicinity of the center of the movement can be performed with higher accuracy.

However, when the position is detected by using conventional position detection systems, a range that can detect the position with higher accuracy and higher resolution may be limited to the vicinity of the center of the movement.

SUMMARY

In one aspect of the present invention, a position detection system for detecting a position of a movable member is devised. The position detection system includes a magnetic field generation unit to generate a magnetic field, a magnetic field detection unit to detect a magnetic flux density of the magnetic field effecting the magnetic field detection unit from the magnetic field generation unit, the magnetic flux density of the magnetic field effecting the magnetic field detection unit changeable depending on a change of a position of the magnetic field detection unit relative to a position of the magnetic field generation unit, and to output a detection voltage corresponding to the magnetic flux density of the magnetic field detected by the magnetic field detection unit, the magnetic field detection unit disposed on the movable member, and circuitry. The circuitry amplifies the detection voltage, sets a reference voltage to be used as a reference for amplifying the detection voltage, and an amplification level of the detection voltage based on at least one of a voltage input to the magnetic field detection unit and a gain value set for the amplification of the detection voltage or both of the voltage input to the magnetic field detection unit and the gain value set for the amplification of the detection voltage, and changes the reference voltage to switch a region used for detecting the position of the movable member.

In another aspect of the present invention, a method of detecting a position of a movable member by using a magnetic field generation unit to generate a magnetic field, a magnetic field detection unit disposed on the movable member, is devised. The method includes detecting a magnetic flux density of the magnetic field effecting the magnetic field detection unit from the magnetic field generation unit, outputting a detection voltage corresponding to the magnetic flux density of the magnetic field detected by the magnetic field detection unit, the magnetic flux density of the magnetic field effecting the magnetic field detection unit changeable depending on a change of a position of the magnetic field detection unit relative to a position of the magnetic field generation unit, amplifying the detection voltage, setting a reference voltage to be used as a reference for amplifying the detection voltage, setting an amplification level of the detection voltage based on at least one of a voltage input to the magnetic field detection unit and a gain value set for the amplification of the detection voltage or both of the voltage input to the magnetic field detection unit and the gain value set for the amplification of the detection voltage, and changing the reference voltage to switch a region used for detecting the position of the movable member.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 2A is a hardware block diagram of the projector of the embodiment;

FIG. 3 is a perspective view of an optical engine of the embodiment;

FIG. 15A is a schematic configuration of the position detection system of the embodiment;

Figure 1:
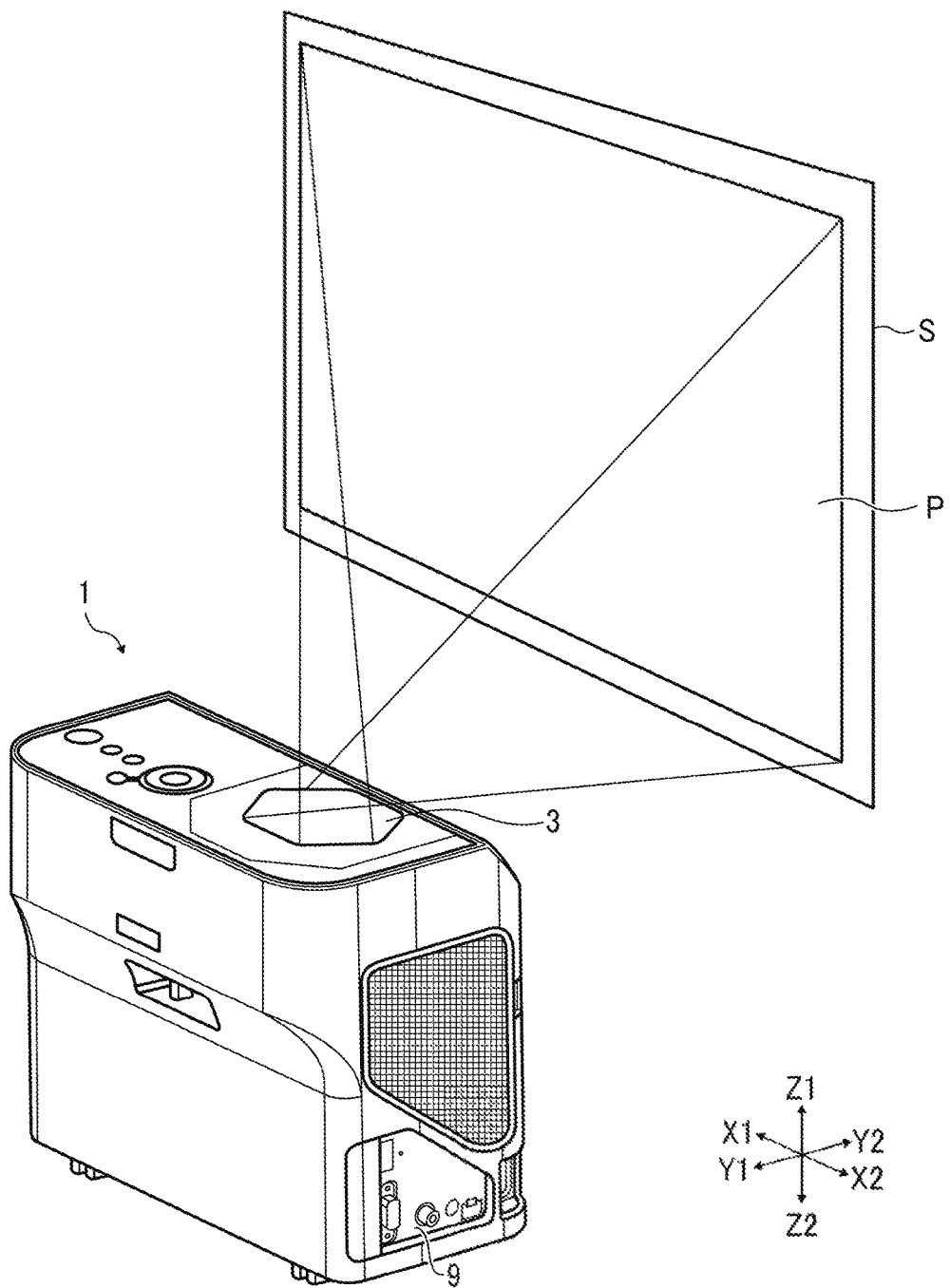
FIG. 1 is a schematic view of a projector according to an embodiment of the present disclosure.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present disclosure with reference to drawings. In this disclosure, components having the same or similar functional configuration among the embodiments of the present disclosure are assigned with the same references, and described by omitting the descriptions if redundant.

As disclosed in the following disclosure, a position detection system of the present disclosure can be applied to an image projection apparatus. Hereinafter, a description is given of the position detection system of the present disclosure applied to the image projection apparatus. It should be noted that the position detection system of the present disclosure can be applied to other apparatuses.

First Embodiment (Image Projection Apparatus)

FIG. 1 is a schematic view of a projector 1 according to an embodiment of the present disclosure.

In this disclosure, the projector 1 is used an example of image projection apparatuses. As illustrated in FIG. 1, the projector 1 includes, for example, an emission window 3 and an external interface (I/F) 9, and an optical engine for generating a projection image in a casing of the projector 1. As to the projector 1, for example, when image data is transmitted from other devises such as a personal computer and a digital camera connected to the external I/F 9, the optical engine generates a projection image based on the received image data and projects an image P from the emission window 3 to a screen S as illustrated in FIG. 1. The other devises such as the personal computer and the digital camera can be connected to the external I/F 9 wirelessly or by wire In the following drawings, an X1-X2 direction indicates a width direction of the projector 1, a Y1-Y2 direction indicates a depth direction of the projector 1, and a Z1-Z2 direction indicates a height direction of the projector 1. Further, a side where the emission window 3 of the projector 1 is provided may be described as a upper side of the projector 1, and a side opposite to the emission window 3 may be described as a lower side of the projector 1 in the Z1-Z2 direction.

FIG. 2A is a hardware block diagram of the projector 1 of the embodiment.

As illustrated in FIG. 2A, the projector 1 includes, for example, a power supply 4, a main switch SW5, an operating unit 7, an external I/F 9, a system control unit 10, an optical engine 15, and a fan 20.

The power supply 4 is connected to a commercial power supply, converts a voltage and a frequency of the commercial power supply to a voltage and a frequency for an internal circuit of the projector 1, and supplies power to the system control unit 10, the optical engine 15, the fan 20, and so on.

The main switch SW5 is used by a user to perform an ON/OFF operation of the projector 1. When the main switch SW5 is turned on when the power supply 4 is connected to the commercial power supply through a power cord, the power supply 4 starts to supply power to each of the units of the projector 1, and when the main switch SW5 is turned off, the power supply 4 stops the supply of power to each of the units of the projector 1.

The operating unit 7 includes a button and the like that receives various operations performed by a user, and is disposed on, for example, the top face of the projector 1. The operating unit 7 receives user operations such as a size, a color tone, and a focus adjustment of a projection image. The user operation received by the operating unit 7 is transmitted to the system control unit 10.

The external I/F 9 has a connection terminal connectable to a device such as a personal computer or a digital camera, and outputs image data transmitted from the connected device to the system control unit 10.

Figure 2B:
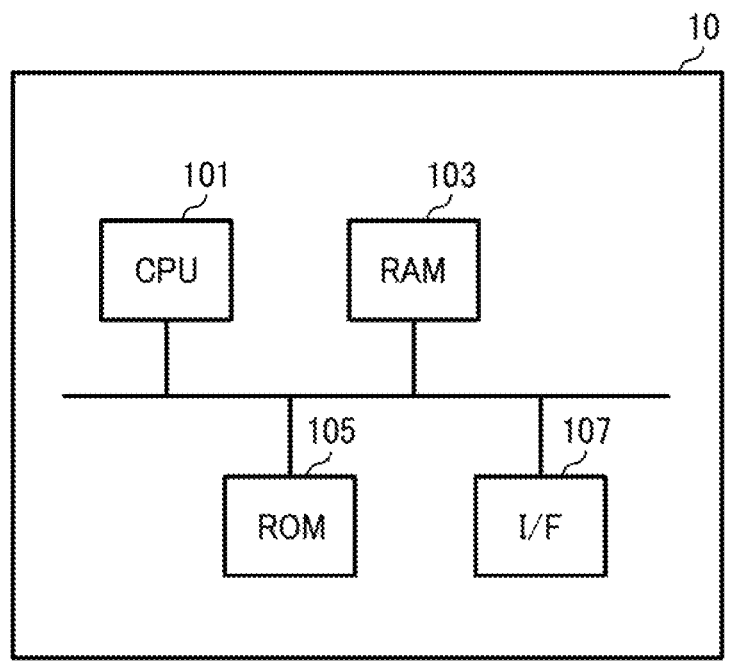
FIG. 2B is a hardware block diagram of a system control unit of FIG. 2A.

FIG. 2B is a hardware block diagram of the system control unit 10 of FIG. 2A. The system control unit 10 includes, for example, an image control unit 11, and a movement control unit 12. As illustrated in FIG. 2B, the system control unit 10 includes, for example, a central processing unit (CPU) 101, a read-only memory (ROM) 105, a random access memory (RAM) 103, and an interface (I/f) 107, and the functions of the units of the system control unit 10 such as the image control unit 11 and the movement control unit 12 are implemented when the CPU 101 executes programs stored in the ROM 105 in cooperation with the RAM 103, but not limited thereto. For example, at least part of the functions of the units of the system control unit 10 (image control unit 11, movement control unit 12) can be implemented by a dedicated hardware circuit (a semiconductor integrated circuit etc.). The program executed by the system control unit 10 according to the present embodiment may be configured to be provided by being recorded in a computer-readable recording medium, such as a compact disk read only memory (CD-ROM), a flexible disk (FD), a compact disk recordable (CD-R), a digital versatile disk (DVD), and a universal serial bus (USB) memory as a file of an installable format or of an executable format. Alternatively, the program may be configured to be provided or distributed through a network such as the Internet. Moreover, various programs may be configured to be provided by being pre-installed into a non-volatile memory such as ROM 105.

The image control unit 11 controls a digital micromirror device (DMD) 551 disposed in an image generation unit 50 of the optical engine 15 based on image data input via the external I/F 9 to generate an image to be projected to the screen S.

The movement control unit 12 controls a drive unit that moves a movable unit 55, movably disposed in the image generation unit 50, to control the position of the DMD 551 disposed in the movable unit 55. The drive unit will be described later in this disclosure.

The fan 20 is rotated under a control of the system control unit 10 to cool the light source 30 of the optical engine 15.

As illustrated in FIG. 2A, the optical engine 15 includes, for example, a light source 30, a light guide unit 40, an image generation unit 50, and a projection unit 60, and is controlled by the system control unit 10 to project an image to the screen S.

The light source 30 is, for example, a high-pressure mercury lamp, a Xenon lamp, and a light-emitting diode (LED), and is controlled by the system control unit 10 to emit the light to the DMD 551 disposed in the image generation unit 50 via the light guide unit 40.

The light guide unit 40 includes, for example, a color wheel, a light tunnel, a relay lens and the like, and guides the light emitted from the light source 30 to the DMD 551 disposed in the image generation unit 50.

The image generation unit 50 includes, for example, a fixed unit 51 fixedly supported in the projector 1, and a movable unit 55 movably supported by the fixed unit 51. The movable unit 55 includes, for example, the DMD 551, and a position of the movable unit 55 with respect to the fixed unit 51 is controlled by the movement control unit 12 of the system control unit 10. The DMD 551 is an example of an image generation element or image generator, and the DMD 551 is controlled by the image control unit 11 of the system control unit 10, and the DMD 551 modulates the light emitted from the light source 30 and guided to the DMD 551 via the light guide unit 40 to generate a projection image. In this description, the fixed unit 51 may be also referred to as the non-movable unit or the first unit, and the movable unit 55 may be also referred to as the second unit.

The projection unit 60 includes, for example, a plurality of projection lenses, mirrors and the like, and enlarges an image generated by the DMD 551 of the image generation unit 50 to project an image to the screen S. The projection unit 60 is an example of a projection device.

(Configuration of Optical Engine)

A description is given of a configuration of each of units of the optical engine 15 in the projector 1.

FIG. 3 is a perspective view of the optical engine 15 of the embodiment. As illustrated in FIG. 3, the optical engine 15 includes, for example, the light source 30, the light guide unit 40, the image generation unit 50, and the projection unit 60, which are disposed inside the projector 1.

The light source 30 is disposed at one side of the light guide unit 40, and emits light in the X2 direction. The light guide unit 40 guides the light emitted from the light source 30 to the image generation unit 50 disposed under the light guide unit 40. The image generation unit 50 uses the light emitted from the light source 30 and guided by the light guide unit 40 to generate a projection image. The projection unit 60 is disposed above the light guide unit 40, and projects the projection image generated by the image generation unit 50 to the outside of the projector 1.

The optical engine 15 of the embodiment is configured to project the image to a upward direction using the light emitted from the light source 30, but not limited thereto. For example, the optical engine 15 can be configured to project the image to a horizontal direction.

(Light Guide Unit)

Figure 4:
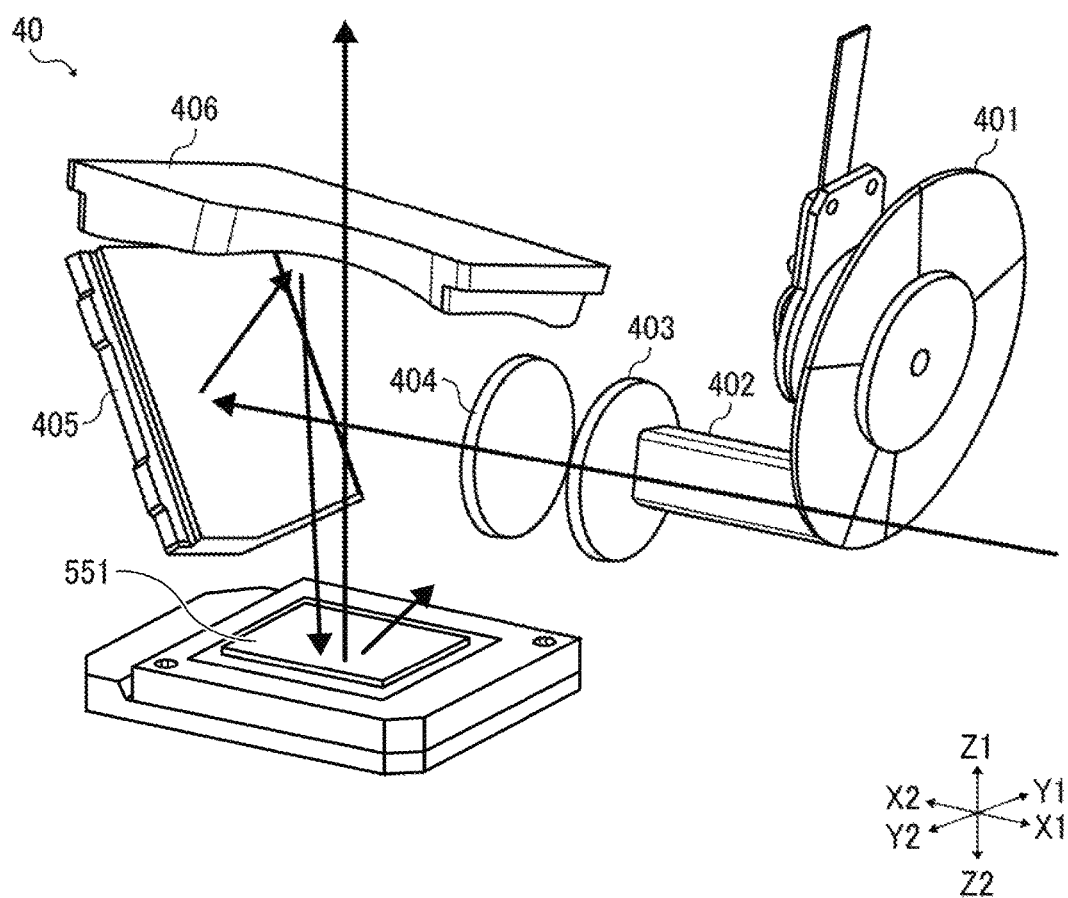
FIG. 4 is a schematic view of an internal configuration of a light guide unit of the embodiment.

FIG. 4 is a schematic view of an internal configuration of the light guide unit 40 of the embodiment.

As illustrated in FIG. 4, the light guide unit 40 includes, for example, a color wheel 401, a light tunnel 402, relay lenses 403 and 404, a flat mirror 405, and a concave mirror 406.

The color wheel 401 is, for example, a disk having filters of R (Red) color, G (Green) color, and B (Blue) color arranged in different portions in the disk such as different portions in a circumferential direction of the disk. The color wheel 401 is configured to rotate with a high speed to divide the light emitted from the light source 30 into the RGB colors with a time division manner.

For example, the light tunnel 402 is formed into a rectangular tube shape by attaching plate glasses. The light tunnel 402 reflects each of R, G, and B color light, coming from the color wheel 401, for a multiple times in the light tunnel 402 to homogenize luminance distribution of the light, and guides the light to the relay lenses 403 and 404.

The relay lenses 403 and 404 condense the light while correcting the axial chromatic aberration of the light exiting from the light tunnel 402.

The flat mirror 405 and the concave mirror 406 reflects the light exiting from the relay lenses 403 and 404 to the DMD 551 disposed in the image generation unit 50. The DMD 551 modulates the light reflected from the concave mirror 406 to generate a projection image.

(Projection Unit)

Figure 5:
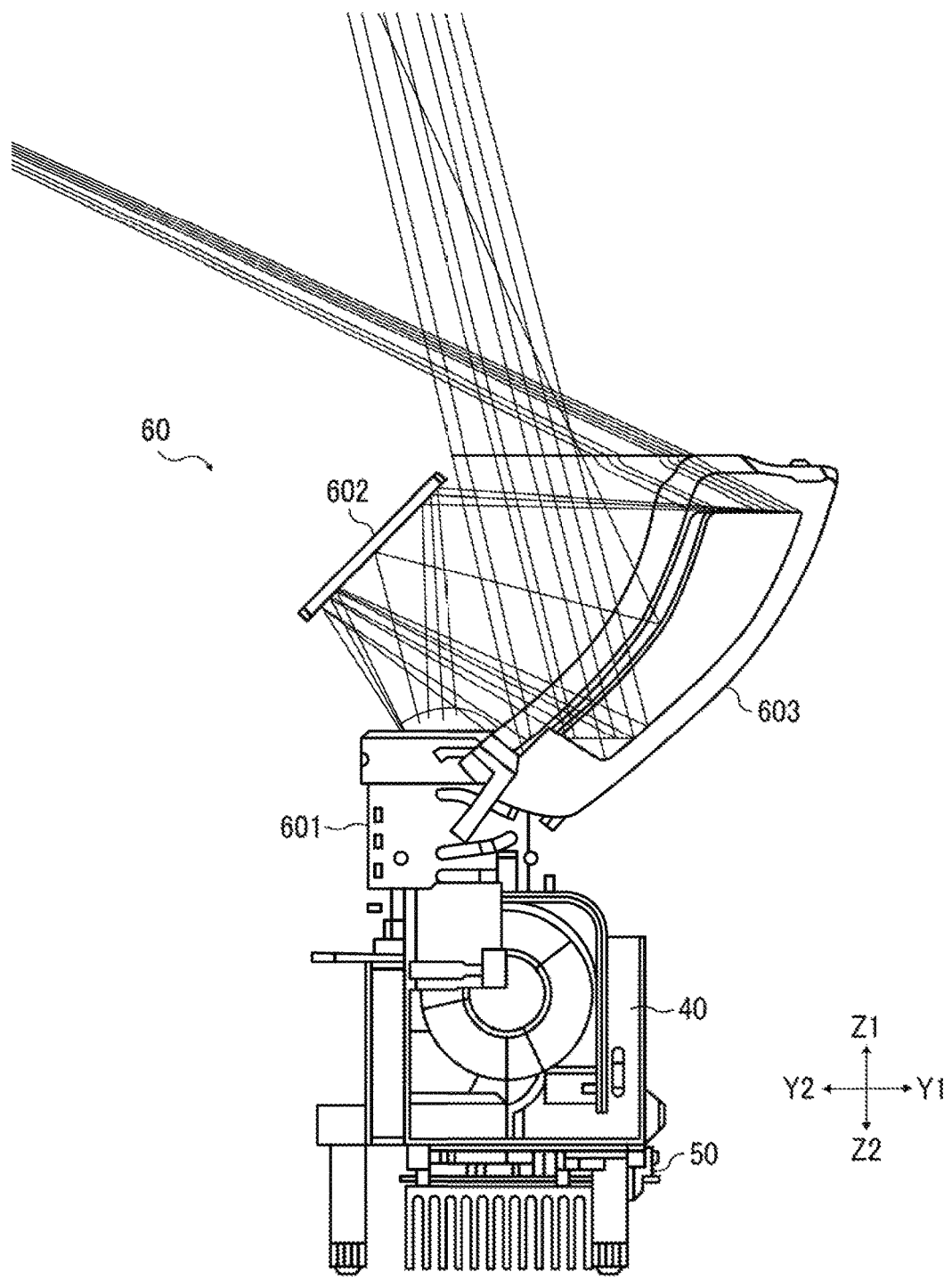
FIG. 5 is a schematic view of an internal configuration of the projection unit of the embodiment.

FIG. 5 is a schematic view of an internal configuration of the projection unit 60 of the embodiment.

As illustrated in FIG. 5, the projection unit 60 includes, for example, a projection lens 601, a reflection mirror 602, and a curved mirror 603 disposed inside a casing of the projection unit 60.

The projection lens 601 includes, for example, a plurality of lenses, and forms a projection image generated by the DMD 551 of the image generation unit 50 on the reflection mirror 602. The reflection mirror 602 and the curved mirror 603 reflect the formed projection image by enlarging the projection image, and projects the enlarged projection image to the screen S or the like disposed outside the projector 1.

(Image Generation Unit)

Figure 6:
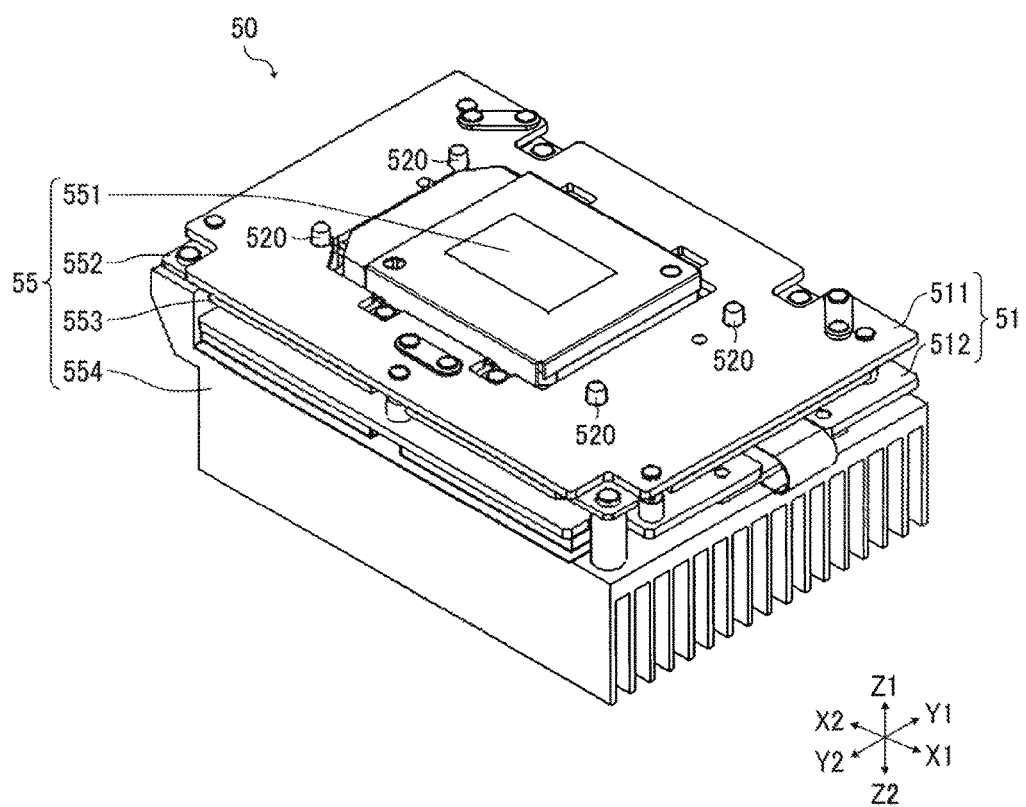
FIG. 6 is a perspective view of an image generation unit of the embodiment.
Figure 7:
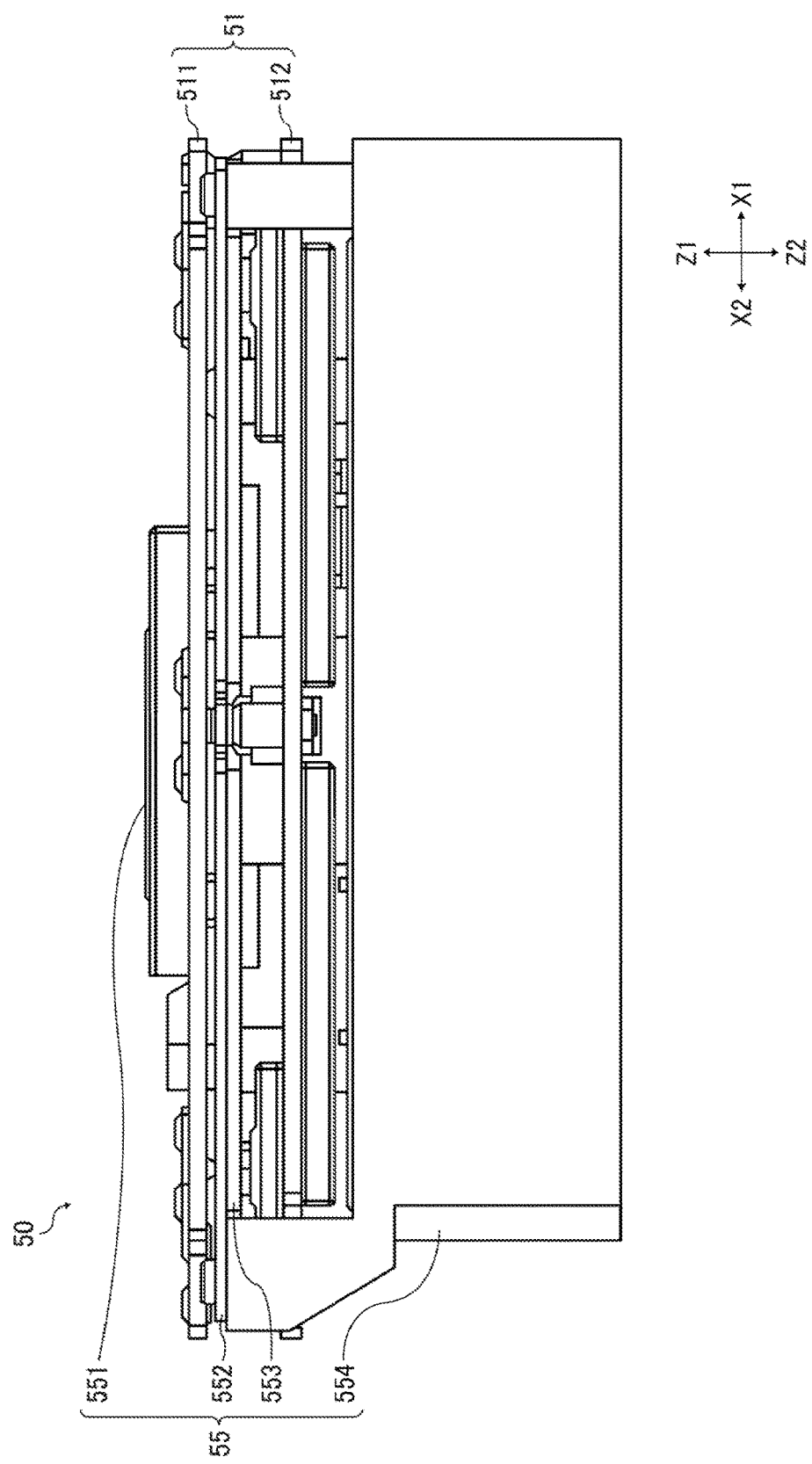
FIG. 7 is a side view of the image generation unit of FIG. 6.

FIG. 6 is a perspective view of the image generation unit 50 of the embodiment. FIG. 7 is a side view of the image generation unit 50 of the embodiment.

As illustrated in FIG. 6 and FIG. 7, the image generation unit 50 includes the fixed unit 51, and the movable unit 55. The fixed unit 51 is fixed to the light guide unit 40 while the movable unit 55 is movably supported by the fixed unit 51.

The fixed unit 51 includes a top plate 511 as a first fixed plate, and a base plate 512 as a second fixed plate. In the fixed unit 51, the top plate 511 and the base plate 512 are provided in parallel with each other with a given space therebetween. The fixed unit 51 is fixed to a bottom side of the light guide unit 40 by using four screws 520 illustrated in FIG. 6.

The movable unit 55 includes the DMD 551, a movable plate 552 as a first movable plate, a DMD substrate 553 as a second movable plate, and a heat sink 554 as a heat radiating unit, and the movable unit 55 is movably supported by the fixed unit 51.

The DMD 551 is disposed on a upper face of the DMD substrate 553. The DMD 551 includes an image generation plane where a plurality of movable micromirrors are arranged in a lattice pattern. As to each of the micromirrors of the DMD 551, the mirror surface of each of the micromirrors of the DMD 551 is mounted tiltably about a torsion axis, and each of the micromirrors of the DMD 551 is ON/OFF driven based on an image signal transmitted from the image control unit 11 of the system control unit 10.

For example, in the case of "ON," an inclination angle of the micromirror is controlled so as to reflect the light emitted from the light source 30 to the projection unit 60. Further, for example, in the case of "OFF," an inclination angle of the micromirror is controlled in a direction for reflecting the light emitted from the light source 30 toward the OFF plate.

With this configuration, in the DMD 551, the inclination angle of each of the micromirrors is controlled by the image signal transmitted from the image control unit 11, and the DMD 551 modulates the light emitted from the light source 30 and guided by the light guide unit 40 to generate a projection image.

The movable plate 552 is supported in a space between the top plate 511 and the base plate 512 of the fixed unit 51, in which the movable plate 552 is movable in a direction parallel to the surfaces of the top plate 511 and the base plate 512.

The DMD substrate 553 is provided between the top plate 511 and the base plate 512 of the fixed unit 51, and is fixed to a lower face of the movable plate 552. The DMD 551 is disposed on the upper face of the DMD substrate 553, and thereby the DMD 551 is movable with the movable plate 552 that is disposed movably as described above.

The heat sink 554 radiates heat generated by the DMD 551, in which at least a part of the heat sink 554 is in contact with the DMD 551, which enables the DMD 551 to be efficiently cooled. The heat sink 554 suppresses an increase of the temperature of the DMD 551 so that occurrence of troubles such as a malfunction or a failure due to the increase of the temperature of the DMD 551 can be reduced. The heat sink 554 is provided movably together with the movable plate 552 and the DMD substrate 553. With this configuration, the heat generated by the DMD 551 can be radiated constantly.

(Fixed Unit)

Figure 8:
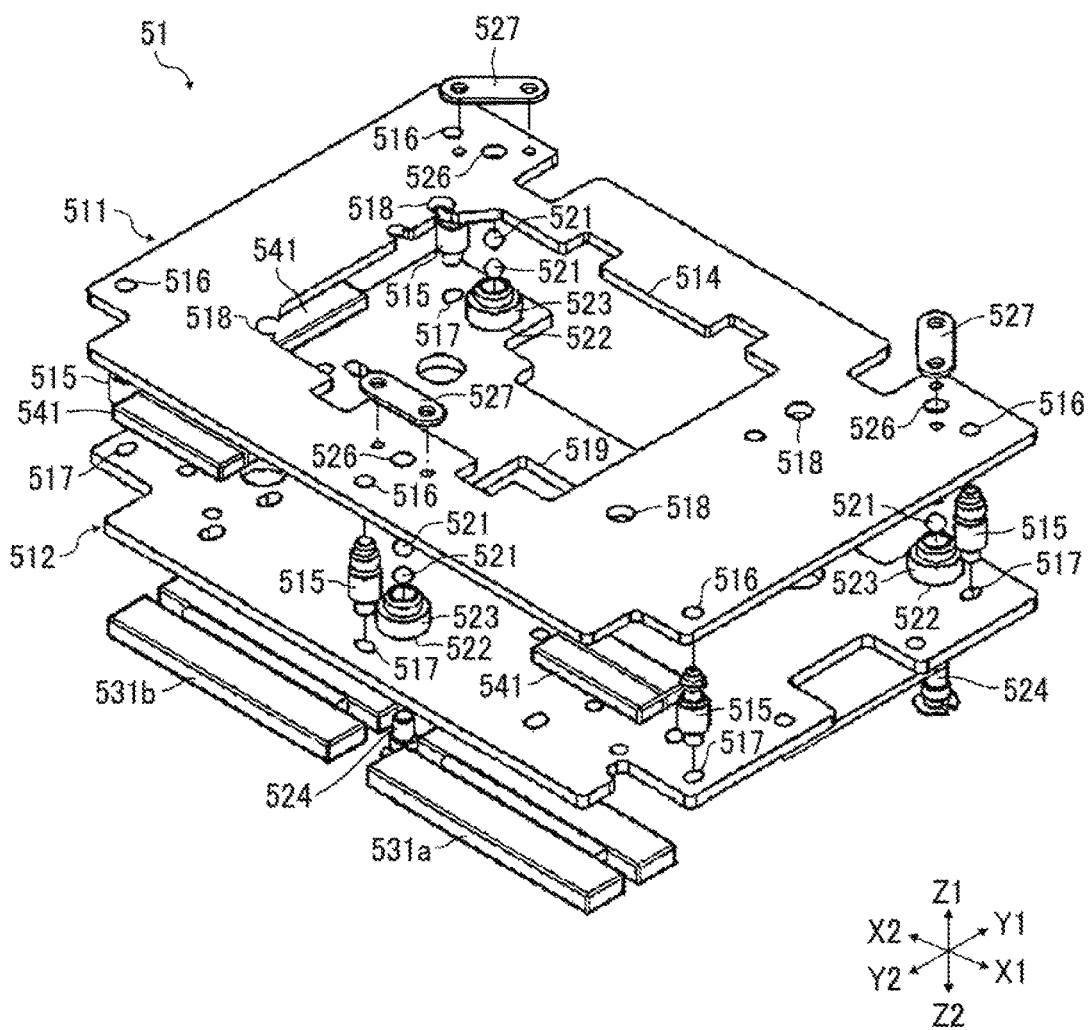
FIG. 8 is an exploded perspective view of a fixed unit of the embodiment.

FIG. 8 is an exploded perspective view of the fixed unit 51 of the embodiment.

As illustrated in FIG. 8, the fixed unit 51 includes the top plate 511 and the base plate 512.

Each of the top plate 511 and the base plate 512 is formed from a plate member such as a flat plate formed of magnetic material such as iron or stainless steel. The top plate 511 and the base plate 512 are provided in parallel with each other by a plurality of supports 515 with a given space therebetween.

The top plate 511 has a central hole 514 provided at a position corresponding to the DMD 551 of the movable unit 55. Further, the base plate 512 has a heat transfer hole 519 formed at a position corresponding to the DMD 551, and a heat transfer unit 563 of the heat sink 554 (FIG. 11) is inserted through the heat transfer hole 519.

As illustrated in FIG. 8, a upper end of the support 515 is inserted into a supporting hole 516 formed in the top plate 511, and a lower end of the support 515 is inserted into a supporting hole 517 firmed in the base plate 512. A plurality of the supports 515 forms a given space between the top plate 511 and the base plate 512 and supports the top plate 511 and the base plate 512 in a parallel manner.

As illustrated in FIG. 8, four screw holes 518 are formed around the central hole 514 in the top plate 511. In this example configuration, two of the four screw holes 518 are continuously formed with the central hole 514. The top plate 511 is fixed to the bottom side of the light guide unit 40 by using the four screws 520 (see FIG. 6) respectively inserted in the four screw holes 518.

Further, a plurality of supporting holes 526 is formed in the top plate 511. Each of the supporting holes 526 rotatably holds a supporting sphere 521 that movably supports the movable plate 552 from the upper side of the movable plate 552. Further, a plurality of supporting holes 522 is formed in the base plate 512. Each of the supporting holes 522 rotatably holds a supporting sphere 521 that movably supports the movable plate 552 from the lower side of the movable plate 552.

The upper end of the supporting hole 526 of top plate 511 is covered by a lid member 527, and the supporting hole 526 rotatably holds the supporting sphere 521. Further, a cylindrical holding member 523 having a female screw groove in its inner periphery is inserted into the supporting hole 522 of the base plate 512. The lower end of the cylindrical holding member 523 is covered by a position adjustment screw 524, and the cylindrical holding member 523 rotatably holds the supporting sphere 521.

The supporting spheres 521 rotatably held by the supporting holes 526 and 522 respectively formed in the top plate 511 and the base plate 512 are in contact with the movable plate 552 provided between the top plate 511 and the base plate 512 to movably support the movable plate 552 from the both faces of the movable plate 552.

Figure 9:
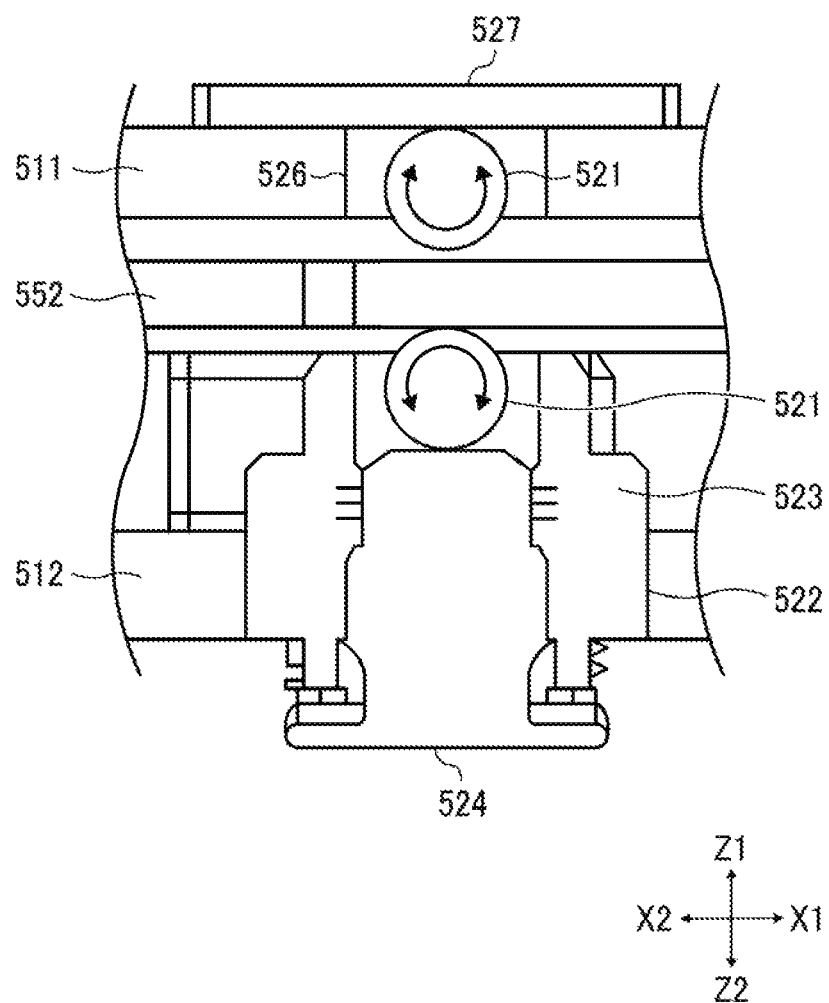
FIG. 9 illustrates a schematic view of a support structure of a movable plate using the fixed unit of FIG. 8.

FIG. 9 illustrates a schematic view of a support structure of the movable plate 552 using the fixed unit 51.

As illustrated in FIG. 9, in the top plate 511, the supporting sphere 521 is rotatably held by the supporting bole 526, and the upper end of the supporting hole 526 is covered by the lid member 527. Further, in the base plate 512, the supporting sphere 521 is rotatably held by the cylindrical holding member 523 inserted into the supporting hole 522.

Each of the supporting spheres 521 is held such that at least a part of the supporting sphere 521 protrudes from the supporting holes 522 and 526, and are in contact with the movable plate 552 provided between the top plate 511 and the base plate 512. The movable plate 552 is supported b the rotatably provided supporting spheres 521 from both sides of the movable plate 552 so as to be supported in parallel to the top plate 511 and the base plate 512 and movably in a direction parallel to the surfaces of the top plate 511 and the base plate 512.

Further, as to the supporting sphere 521 disposed on the base plate 512, an amount of protrusion of the supporting sphere 521 from the upper end of the cylindrical holding member 523 can be changed by adjusting the position of the position adjustment screw 524. For example, when the position adjustment screw 524 is displaced in the Z1 direction, the amount of protrusion of the supporting sphere 521 increases so that an interval between the base plate 512 and the movable plate 552 is increased. Further, for example, when the position adjustment screw 524 is displaced in the Z2 direction, the amount of protrusion of the supporting sphere 521 decreases so that the interval between the base plate 512 and the movable plate 552 is reduced.

With this configuration, by changing the amount of protrusion of the supporting sphere 521 using the position adjustment screw 524, the interval between the base plate 512 and the movable plate 552 can be appropriately adjusted.

Further, as illustrated in FIG. 8, a plurality of position-detection magnets 541 is disposed on the upper face of the base plate 512. Each of the position-detection magnets 541 is configured with two cuboid permanent magnets arranged such that their longitudinal directions are parallel with each other, and the two cuboid permanent magnets form a magnetic field effecting the DMD substrate 553 disposed between the top plate 511 and the base plate 512. Hereinafter, the plurality of position-detection magnets 541 may be simply referred to as the position-detection magnet 541 for the simplicity of the description.

The position-detection magnet 541 and the Hall element 542 (FIG. 11) disposed on the lower face of the DMD substrate 553 can be used as components to configure a position detection system that detects a position of the DMD 551.

Further, as illustrated in FIG. 8, a plurality of drive-use magnet units 531a, 531b, 531c is disposed on the lower face of the base plate 512, wherein the drive-use magnet unit 531c is not seen in FIG. 8. Hereinafter, the plurality of drive-use magnet units 531a, 531b, 531c may be simply referred to as the drive-use magnet unit 531 or the drive-use magnet units 531.

Each of the drive-use magnet units 531 includes two permanent magnets having rectangular parallelepiped shape and arranged in parallel along a long side of the two permanent magnets, and the two permanent magnets form a magnetic field effecting the heat sink 554. A combination of the drive-use magnet unit 531 and a drive coil 581 disposed on the upper face of the heat sink 554 configure a drive unit that moves the movable unit 55.

Further, the number and position of the supports 515 and the supporting spheres 521 provided in the fixed unit 51 are not limited to the configuration illustrated in the embodiment.

(Movable Unit)

Figure 10:
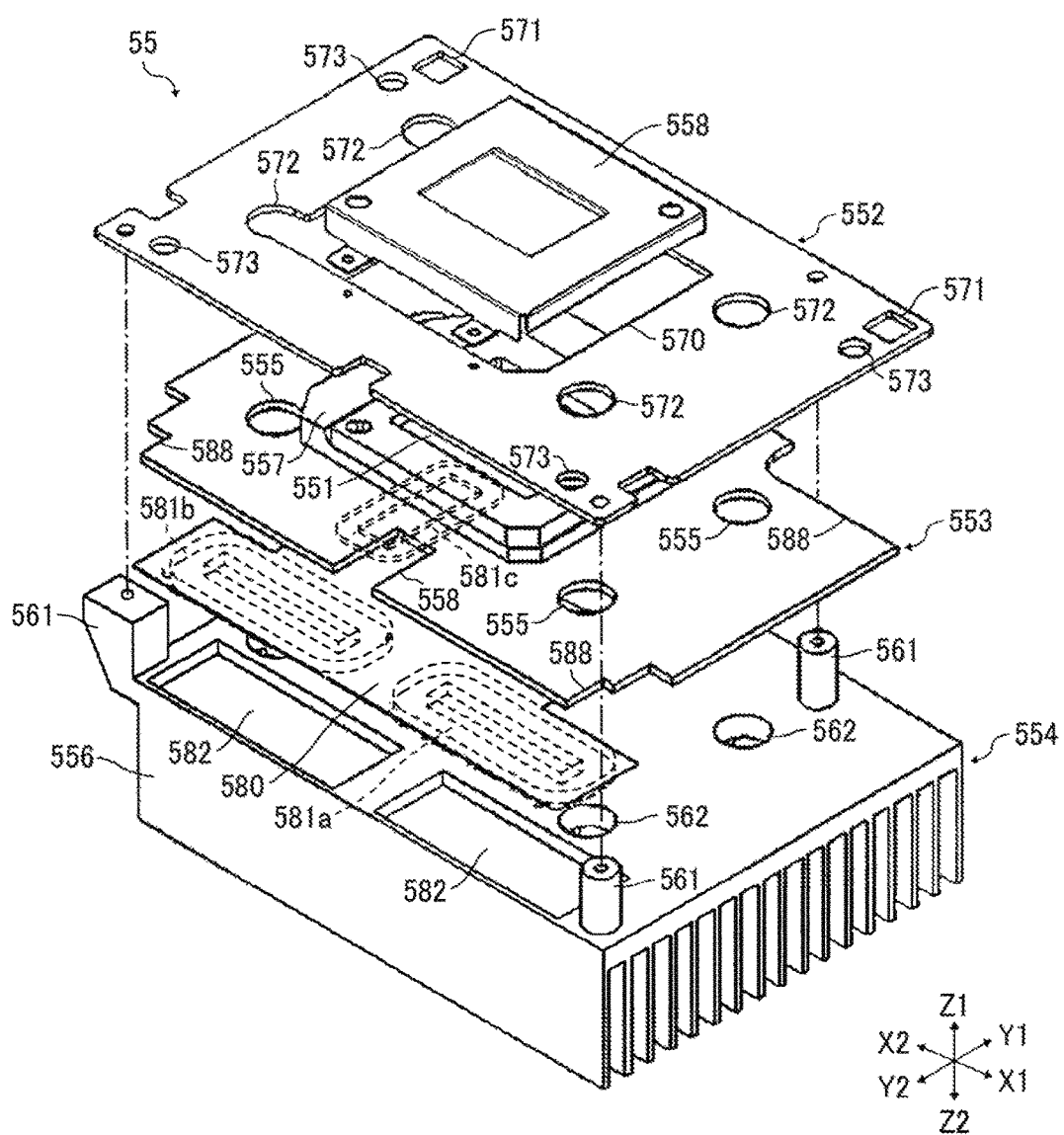
FIG. 10 is a perspective view of a movable unit of the embodiment.
Figure 11:
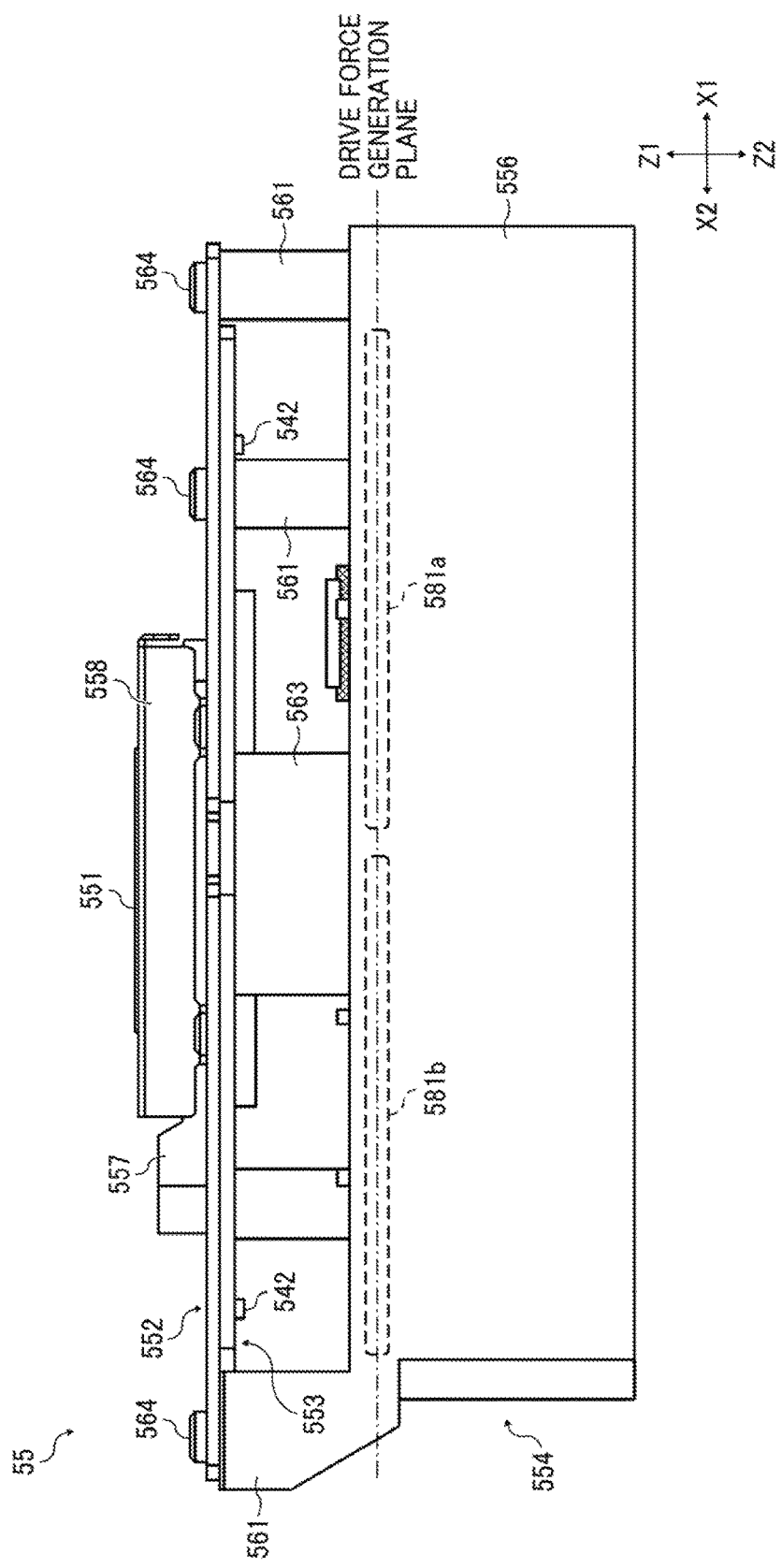
FIG. 11 is a side view of the movable unit of the embodiment.

FIG. 10 is a perspective view of the movable unit 55 of the embodiment. FIG. 11 is a side view of the movable unit 55 of the embodiment.

As illustrated in FIG. 10 and FIG. 11, the movable unit 55 includes, for example, the DMD 551, the movable plate 552, the DMD substrate 553, and the heat sink 554.

As described above, the movable plate 552 is provided between the top plate 511 and the base plate 512 of the fixed unit 51, and is supported movably in a direction parallel to the surfaces of the top plate 511 and the base plate 512 by the supporting spheres 521.

As illustrated in FIG. 10, the movable plate 552 has a central hole 570 formed at a position corresponding to the DMD 551 disposed on the DMD substrate 553, and through holes 572 into which the screws 520 to fix the top plate 511 to the light guide unit 40 are inserted. Further, a plurality of link-use holes 573 is formed in the movable plate 552 used for linking the movable plate 552 to the DMD substrate 553, and a movable range restriction hole 571 is formed in the movable plate 552 at a position corresponding to the support 515 of the fixed unit 51.

The movable plate 552 and the DMD substrate 553 are linked and fixed with each other by screws inserted into the link use holes 573 in a state that an interval between the movable plate 552 and the DMD substrate 553 is adjusted such that the surface of the movable plate 552 and the image generation plane of the DMD 551 are set in parallel with each other, in which the movable plate 552 and the DMD substrate 553 can be fixed firmly by using an adhesive.

In the above described configuration, the movable plate 552 moves in a direction parallel to the surface of the movable plate 552, and the DMD 551 also moves with the movable plate 552. Therefore, if the surface of the movable plate 552 and the image generation plane of the DMD 551 are not in parallel with each other, the image generation plane of the DMD 551 may be inclined with respect to a moving direction of the DMD 551, with which an image may be distorted (i.e., image quality deteriorates).

Therefore, in the embodiment, the interval between the movable plate 552 and the DMD substrate 553 is adjusted with the screws inserted the link-use holes 573, and the surface of the movable plate 552 and the image generation plane of the DMD 551 are maintained in parallel with each other, with which deterioration of the image quality can be suppressed.

The support 515 of the fixed unit 51 is inserted in the movable range restriction hole 571, and the movable range restriction hole 571 restricts a movable range of the movable plate 552 by contacting with the support 515 when the movable plate 552 is largely moved due to, for example, vibration or some abnormality.

Further, the number, position, and the shape of the link-use holes 573 and the movable range restriction hole 571 are not limited to the configuration illustrated in the embodiment. Further, the movable plate 552 and the DMD substrate 553 can be connected or linked with each other using a configuration different from the configuration of the embodiment.

The DMD substrate 553 is provided between the top plate 511 and the base plate 512 of the fixed unit 51, and is linked to the lower face of the movable plate 552 as described above.

The DMD 551 is disposed on the upper surface of the DMD substrate 553. The DMD 551 is connected to the DMD substrate 553 via a socket 557 and the periphery of the DMD 551 is covered by a cover 558. The DMD 551 is exposed through the central hole 570 of the top plate 511 to the upper face side of the movable plate 552.

As to the DMD substrate 553, through holes 555 are formed in the DMD substrate 553 through which the screws 520 for fixing the top plate 511 to the light guide unit 40 are inserted. Further, as to the DMD substrate 553, notches 588 are formed at portions facing the link members 561 such that the movable plate 552 is fixed to the link members 561 of the heat sink 554.

For example, if the movable plate 552 and the DMD substrate 553 are both fixed to the link member 561 of the heat sink 554, the DMD substrate 553 may be distorted, and the image generation plane of the DMD 551 may be inclined with respect to the moving direction, in which there is a possibility that an image may be distorted. In view of this issue, the notches 588 are formed at peripheral portions of the DMD substrate 553 so that the link members 561 of the heat sink 554 are linked to the movable plate 552 while avoiding the DMD substrate 553.

With this configuration, since the heat sink 554 is connected and linked to the movable plate 552, a possibility that the DMD substrate 553 receives a load from the heat sink 554 can be reduced, and thereby an image distortion can be reduced. Therefore, the image quality can be maintained by maintaining the image generation plane of the DMD 551 parallel to the moving direction.

Further, the notch 588 is formed for the DMD substrate 553 by setting a size of the notch 588 greater than an area around the supporting holes 522 of the base plate 512 so that the supporting sphere 521 held on the base plate 512 contacts the movable plate 552 while avoiding the DMD substrate 553. With this configuration, the DMD substrate 553 is prevented from being distorted due to the load from the supporting sphere 521, and the image generation plane of the DMD 551 can be moved in parallel to the moving direction, with which the image quality can be maintained.

Further, the shape of the notch 588 is not limited to the shape exemplified in the embodiment. For example, instead of the notch 588, a through hole can be formed in the DMD substrate 553 as long as the DMD substrate 553 is not contact with the link members 561 of the heat sink 554 and the supporting sphere 521.

Further, as illustrated in FIG. 11, a plurality of Hall elements 542 is disposed on the lower face of the DMD substrate 553 at a plurality of positions facing the position-detection magnets 541 disposed on the upper face of the base plate 512, in which the Hall element 542 is used as an example of a magnetic sensor. The Hall element 542 and the position-detection magnet 541 disposed on the base plate 512 can be used as components to configure the position detection system that detects a position of the DMD 551.

As illustrated in FIG. 10 and FIG. 11, the heat sink 554 includes, for example, a heat dissipation unit 556, the link members 561, and the heat transfer unit 563.

As illustrated in FIG. 10, a plurality of fins are formed at the lower part of the heat dissipation unit 556 for radiating heat generated by the DMD 551. As illustrated in FIG. 10, a plurality of concave portions 582 is formed on the upper face of the heat dissipation unit 556 to set the drive coils 581a, 581b, and 581c, attached on a flexible substrate 580, in each of the concave portions 582 respectively. In the following description, the drive coils 581a, 581b, and 581c may be simply referred to as the drive coils 581 or the drive coil 581.

The concave portion 582 is formed at a position facing the drive-use magnet unit 531 disposed on the lower face of the base plate 512. A combination of the drive coil 581 attached to the concave portion 582 of the heat dissipation unit 556 and the drive-use magnet unit 531 disposed on the lower face of the base plate 512 configure the drive unit used for moving the movable unit 55 with respect to the fixed unit 51.

Further, through holes 562 are formed in the heat dissipation unit 556, through which the screws 520 for fixing the top plate 511 to the light guide unit 40 are inserted.

The link members 561 are formed at three portions while extending in the Z1 direction from the upper face of the heat dissipation unit 556, and the movable plate 552 is fixed to the upper end of each of the link members 561 by screws 564 (see FIG. 11). The link members 561 are linked to the movable plate 552 without contacting the DMD substrate 553 because the notches 588 are formed in the DMD substrate 553.

As illustrated in FIG. 11, the heat transfer unit 563 extends in the Z1 direction from the upper face of the heat dissipation unit 556, and abuts against the lower face of the DMD 551, with which heat generated by the DMD 551 is transferred to the heat dissipation unit 556 via the heat transfer unit 563. Further, a heat transfer sheet can be provided between the upper end face of the heat transfer unit 563 and the DMD 551 to increase heat conductivity. By setting the heat transfer sheet, thermal conductivity between the heat transfer unit 563 of the heat sink 554 and the DMD 551 is enhanced, with which the cooling effect of the DMD 551 is enhanced.

As illustrated in FIG. 10, the through hole 572 of the movable plate 552, the through hole 555 of the DMD substrate 553, and the through hole 562 of the heat sink 554 are formed by aligning the through holes 572, 555, and 562 along the Z1-Z2 direction, and the screw 520 for fixing the top plate 511 to the light guide unit 40 is inserted from the bottom side.

In the above described configuration, there is a space between the surface of the DMD substrate 553 and the image generation plane of the DMD 551, in which the space corresponds to the thickness of the socket 557 and the thickness of the DMD 551. If the DMD substrate 553 is placed above the upper side of the top plate 511, the space from the surface of the DMD substrate 553 to the image generation plane of the DMD 551 becomes a dead space, with which the apparatus configuration may become larger.

In the embodiment, by providing the DMD substrate 553 between the top plate 511 and the base plate 512, the top plate 511 is placed in the space from the surface of the DMD substrate 553 to the image generation plane of the DMD 551. With this configuration, the height in the Z1-Z2 direction can be reduced by effectively utilizing the space from the surface of the DMD substrate 553 to the image generation plane of the DMD 551, with which the apparatus configuration can be reduced. Therefore, the image generation unit 50 of the embodiment can be assembled not only to larger projectors but also to smaller projectors, in which versatility of the image generation unit 50 is enhanced.

(Drive Unit)

Figure 12:
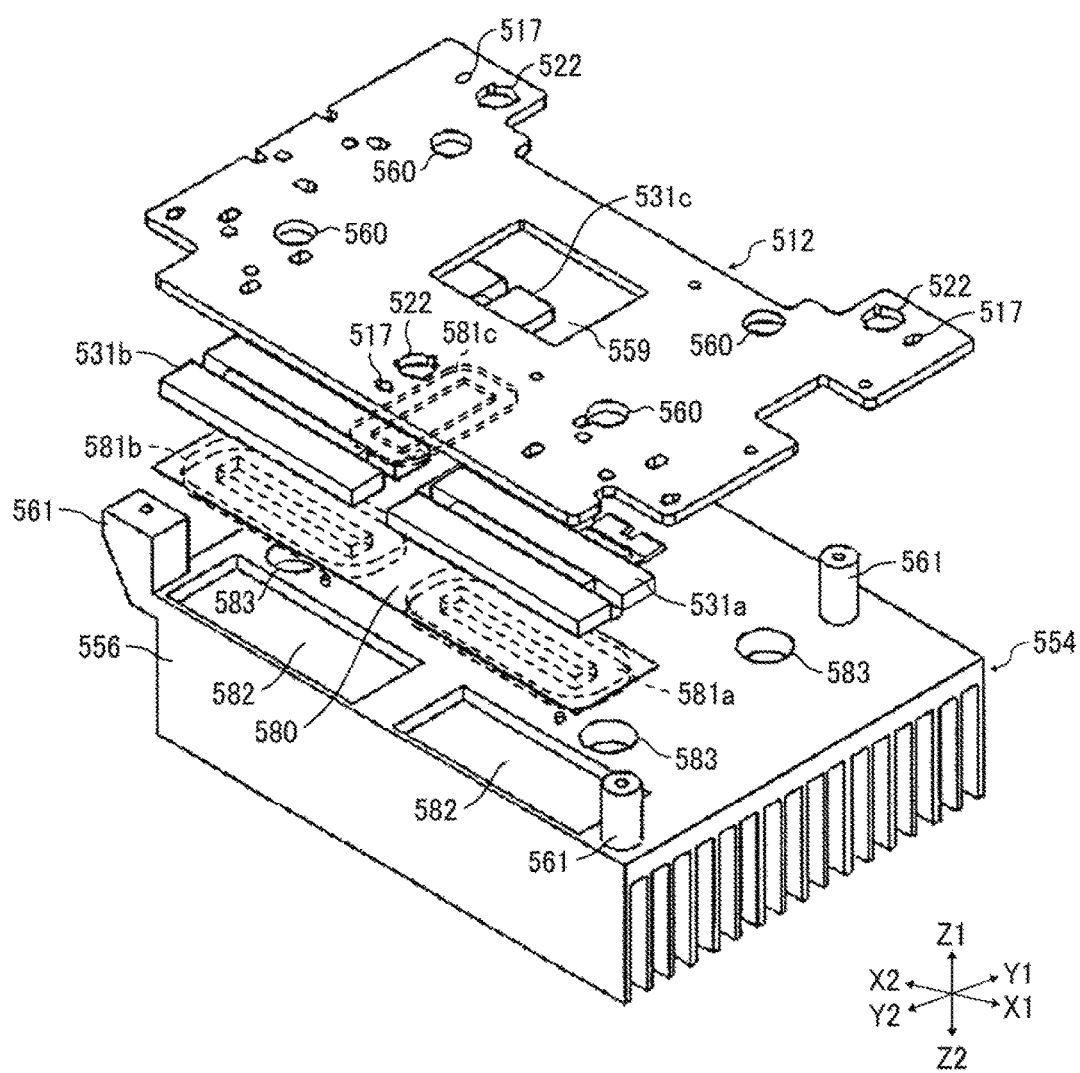
FIG. 12 is an exploded perspective view of a configuration including a drive unit of the embodiment.

FIG. 12 is an exploded perspective view of a configuration including the drive unit of the embodiment.

In the embodiment, the drive unit includes, for example, the drive-use magnet unit 531 disposed on the base plate 512, and the drive coil 581 disposed on the heat sink 554.

Each of the drive-use magnet unit 531a and the drive-use magnet unit 531b is configured with two permanent magnets, and the longitudinal direction of the two permanent magnets are set parallel to the X1-X2 direction. Further, the drive-use magnet unit 531c is configured with two permanent magnets, and the longitudinal direction of the two permanent magnets are set parallel to the Y1-Y2 direction. Each of the drive-use magnet units 531 respectively forms a magnetic field effecting the heat sink 554.

Each of the drive coils 581 is formed by an electric wire being wound about an axis parallel to the Z1-Z2 direction, and attached in the concave portion 582 formed on the upper face of the heat dissipation unit 556 of the heat sink 554.

The drive-use magnet unit 531 on the base plate 512 and the drive coil 581 on the heat sink 554 are provided at positions so as to face each other in a state that the movable unit 55 is supported by the fixed unit 51. When a current is made to flow in the drive coil 581, a Lorentz force used as a drive force for moving the movable unit 55 is generated for the drive coil 581 by the magnetic field formed by the drive-use magnet unit 531.

When the movable unit 55 receives the Lorentz force generated as the drive force between the drive-use magnet unit 531 and the drive coil 581, the movable unit 55 is linearly or rotationally displaced on the X-Y plane with respect to the fixed unit 51.

In the embodiment, the drive coil 581a and the drive-use magnet unit 531a, and the drive coil 581b and the drive-use magnet unit 531b disposed at the opposite positions in the X1-X2 direction configure a first drive unit. When a current is made to flow in the drive coil 581a and the drive coil 581b, a Lorentz force in the Y1 direction or Y2 direction is generated.

The movable unit 55 is moved in the Y1 direction or the Y2 direction by the Lorentz forces generated by the drive coil 581a and the drive coil 581b. Further, the movable unit 55 is displaced to rotate on the X-Y plane by a Lorentz force generated by the drive coil 581a and a Lorentz force generated by the drive coil 581b, which are generated in the opposite directions.

For example, when a current is made to flow in the drive coil 581a to generate a Lorentz force in the Y1 direction, and a current is made to flow in the drive coil 581b to generate a Lorentz force in the Y2 direction, the movable unit 55 is displaced to rotate into a counterclockwise direction when viewed from the top. Further, when a current is made to flow in the drive coil 581a to generate a Lorentz force in the Y2 direction, and a current is made to flow in the drive coil 581b to generate a Lorentz force in the Y1 direction, the movable unit 55 is displaced to rotate into a clockwise direction when viewed from the top.

Further, in the embodiment, the drive coil 581c and the drive-use magnet unit 531c configure a second drive unit. The drive-use magnet unit 531c is arranged such that the longitudinal direction of the drive-use magnet unit 531c is orthogonal to the longitudinal direction of the drive-use magnet unit 531a and the drive-use magnet unit 531b. In this configuration, when a current is made to flow in the drive coil 581c, a Lorentz force in the X1 direction or X2 direction is generated, and then the movable unit 55 is moved in the X1 direction or the X2 direction by the Lorentz force generated by the drive coil 581c.

The magnitude and direction of the current to be made to flow in each of the drive coils 581 is controlled by the movement control unit 12 of the system control unit 10. The movement control unit 12 controls a movement direction (linear or rotation direction), a movement amount, and a rotation angle of the movable plate 552 by controlling the magnitude and direction of the current to be made to flow in each of the drive coils 581.

Further, a heat transfer hole 559 is formed in the base plate 512 at a portion facing the DMD 551 provided in the DMD substrate 553, and the heat transfer unit 563 of the heat sink 554 is inserted through the heat transfer hole 559. Further, through holes 560 are formed in the base plate 512, and the screws 520 for fixing the top plate 511 to the light guide unit 40 are inserted through the through holes 560.

As to the movable unit 55 of the embodiment, the weight of the heat sink 554 is set greater than the total weight of the movable plate 552 and the DMD substrate 553. Therefore, the center of gravity position of the movable unit 55 in the Z1-Z2 direction is located near the heat dissipation unit 556 of the heats sink 554.

In this configuration, for example, if the drive coil 581 is disposed on the movable plate 552, and a Lorentz force used as a drive force acts the movable plate 552, the center of gravity position of the movable unit 55 and the drive force generation plane locating the drive coil 581 is separated from each other in the Z1-Z2 direction. This situation similarly occurs when the drive coil 581 is provided in the DMD substrate 553.

In the configuration that the center of gravity position of the movable unit 55 and the drive force generation plane are separated, the center of gravity position is set as a support point in the Z1-Z2 direction, and the drive force generation plane is used as an action point in the Z1-Z2 direction, with which a swing like a pendulum may occur. Since a moment acting the drive force generation plane increases as the interval between the support point and the action point becomes longer, the greater the interval of the center of gravity position of the movable unit 55 and the drive force generation plane in the Z1-Z2 direction, the greater the vibration, and it becomes difficult to control the position of the DMD 551.

Further, if the movable unit 55 shakes like a pendulum, the load acting to the movable plate 552, and the top plate 511 and the base plate 512 supporting the movable plate 552 becomes greater, with which distortion and breakage may occur to each of the plates, and thereby an image may be distorted.

Therefore, in the embodiment, by providing the drive coil 581 in the concave portion 582 of the heat sink 554, as illustrated in FIG. 11, the drive force generation plane is located in the heat dissipation unit 556 of the heat sink 554. With this configuration, the interval between the center of gravity position of the movable unit 55 and the drive force generation plane in the Z1-Z2 direction can be set smaller as much as possible.

Therefore, as to the movable unit 55 of the embodiment, the moving direction of the movable unit 55 can be maintained in a direction parallel to the X-Y plane without swinging like a pendulum so that the above described problems such as distortion and breakage of each plate may not occur, and an operational stability of the movable unit 55 can be enhanced, and the position of the DMD 551 can be controlled with a higher precision. Further, the positions of the drive-use magnet unit 531a, 531b, 531c and the drive coil 581a, 581b, 581c can be respectively changed, in which the drive-use magnet units 531 are disposed on a side of the heat sink 554 closer to the base plate 512, and the drive coils 581 are disposed on a side of the base plate 512 closer to the heat sink 554, and the same effect of preventing the above described problems such as distortion and breakage of each plate can be devised.

Further, it is preferable that the center of gravity position of the movable unit 55 and the drive force generation plane are matched in the Z1-Z2 direction. For example, by appropriately changing the depth of the concave portion 582 to which the drive coil 581 is attached, and the shape of the heat dissipation unit 556 of the heat sink 554, the center of gravity position of the movable unit 55 and the drive force generation plane can be matched in the Z1-Z2 direction.

(Position Detection System)

Figure 13:
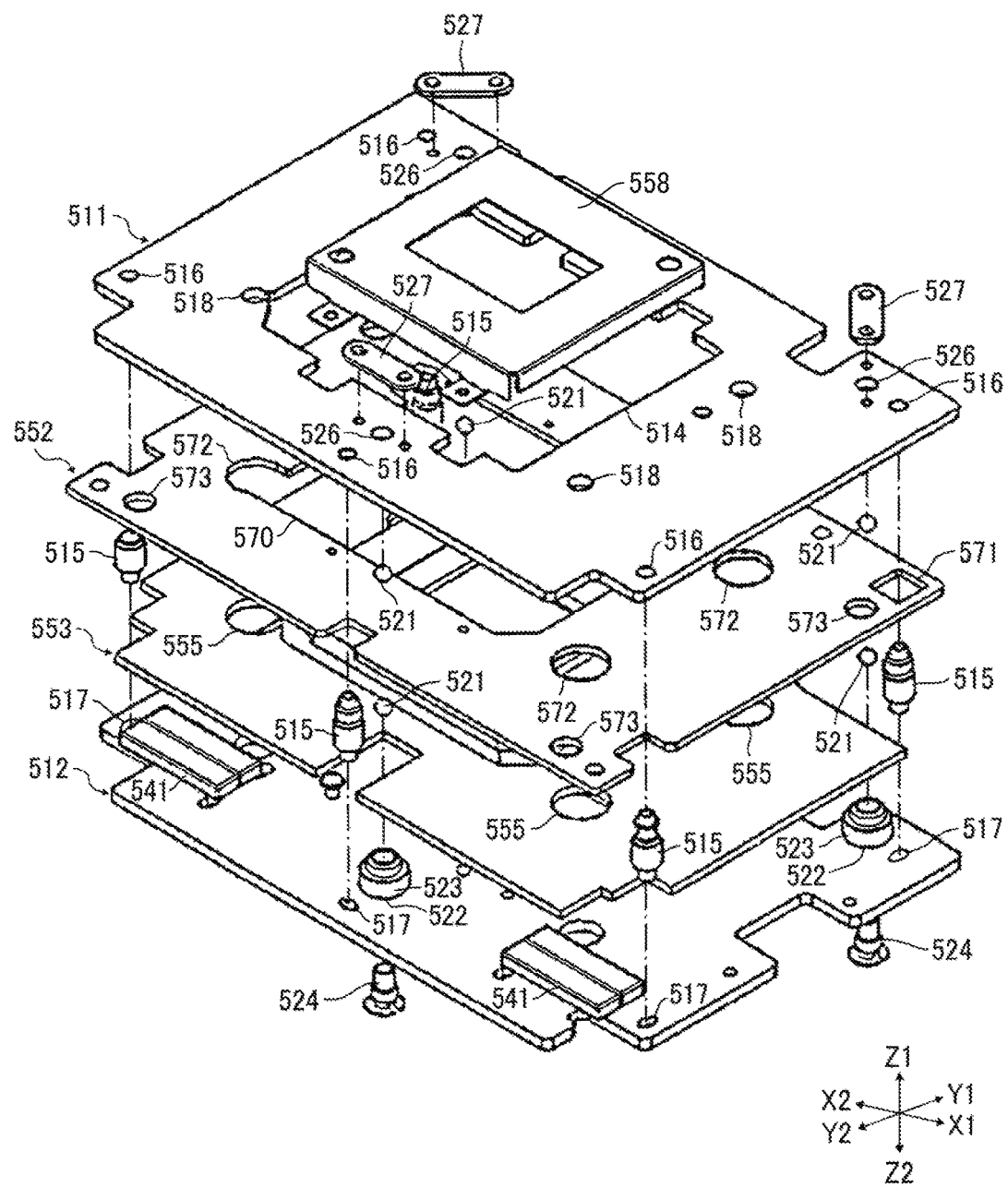
FIG. 13 is an exploded perspective view of a configuration including a position detection system of the embodiment.
Figure 14:
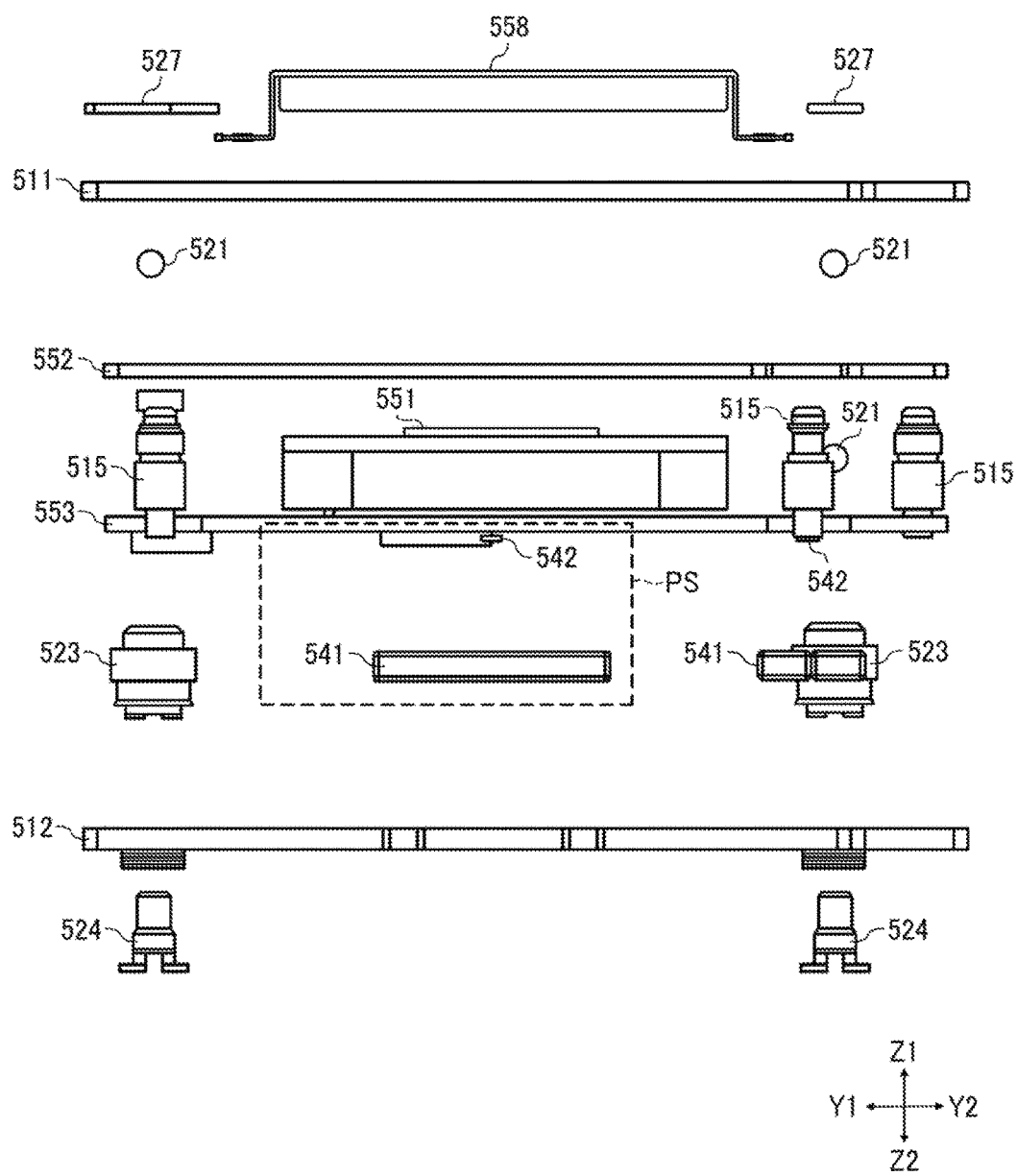
FIG. 14 is an exploded side view of the configuration including the position detection system of the embodiment.

FIG. 13 is an exploded perspective view of a configuration including the position detection system of the embodiment, and FIG. 14 is an exploded side view of the configuration including the position detection system of FIG. 13.

In the embodiment, the position detection system includes the position-detection magnet 541 disposed on the base plate 512, and the Hall element 542 disposed on the DMD substrate 553. The position-detection magnet 541 and the Hall element 542 are arranged to face with each other in the Z1-Z2 direction.

The Hall element 542 is an example of a magnetic sensor, and the position-detection magnet 541 is provided at a position opposite to the Hall element 542. The Hall element 542 outputs a signal, corresponding to a change of the magnetic flux density effecting from the position-detection magnet 541, to the movement control unit 12 of the system control unit 10. The movement control unit 12 detects a position of the Hall element 542 with respect to the fixed unit 51 based on the signal transmitted from the Hall element 542, and then detects a position of the DMD 551 provided in the DMD substrate 553 based on the detected position of the Hall element 542.

In the embodiment, the top plate 511 and the base plate 512, formed of magnetic material, function as yoke plates and configure a magnetic circuit with the position-detection magnet 541. Further, the magnetic flux generated by the drive unit including the drive-use magnet unit 531 and the drive coil 581, provided between the base plate 512 and the heat sink 554, concentrates on the base plate 512, which functions as the yoke plate, with which the leakage of the magnetic flux from the drive unit to the position detection system is suppressed.

Therefore, at the Hall element 542 disposed on the lower face side of the DMD substrate 553, the influence of the magnetic field formed by the drive unit including the drive-use magnet unit 531 and the drive coil 581 is reduced so that the Hall element 542 can output a signal corresponding to the change of the magnetic flux density of the position-detection magnet 541 without being affected by the magnetic field generated by the drive unit. Therefore, the movement control unit 12 can detect the position of the DMD 551 with higher accuracy.

With this configuration, based on the output of the Hall element 542 with the reduced influence from the drive unit, the movement control unit 12 can detect the position of the DMD 551 with enhanced precision or accuracy. Therefore, the movement control unit 12 can control the magnitude and direction of the current to be made to flow to each of the drive coils 581 depending on the detected position of the DMD 551, and can control the position of the DMD 551 with enhanced precision or accuracy.

Further, the configuration of the drive unit and the position detection system are not limited to the above described configuration exemplified in the embodiment. The number and position of the drive-use magnet unit 531 and the drive coil 581 provided as the drive unit can be set differently from those of the embodiment as long as the movable unit 55 can be moved to any positions within a given range. Further, the number and position of the position-detection magnet 541 and the Hall element 542 used for configuring the position detection system can be set differently from those of the embodiment as long as the position of the DMD 551 can be detected.

For example, the position-detection magnet 541 can be disposed on the top plate 511 while the Hall element 542 can be disposed on the movable plate 552. Further, for example, the position detection system can be provided between the base plate 512 and the heat sink 554, and the drive unit can be provided between the top plate 511 and the base plate 512. In these configurations, it is preferable to provide a yoke plate between the drive unit and the position detection system so that the influence of the magnetic field from the drive unit to the position detection system can be reduced. Further, since the controlling of the position of the movable unit 55 becomes difficult when the weight of the movable unit 55 increases, each of the drive-use magnet unit 531 and the position-detection magnet 541 is preferably disposed on the fixed unit 51 such as the top plate 511 or the base plate 512.

Further, the top plate 511 and the base plate 512 can be partially formed of magnetic material if the leakage of magnetic flux from the drive unit to the position detection system can be reduced. For example, each of the top plate 511 and the base plate 512 can be formed by stacking a plurality of members including a flat plate-like or sheet-like member made of magnetic material. If at least a part of the base plate 512 is formed of magnetic material to function as the yoke plate to prevent leakage of magnetic flux from the drive unit to the position detection system, the top plate 511 can be formed of non-magnetic material.

(Image Projection)

As described above, as to the projector 1 of the embodiment, a projection image is generated by the DMD 551 provided in the movable unit 55, and the position of the movable unit 55 is controlled by the movement control unit 12 of the system control unit 10.

For example, the movement control unit 12 controls the position of the movable unit 55 with a given cycle corresponding to a frame rate set for an image projection operation so that the movable unit 55 can move with a faster speed between a plurality of positions distanced with each other less than a distance of an arrangement interval of the plurality of micromirrors of the DMD 551, in which the image control unit 11 transmits an image signal to the DMD 551 corresponding to a position of the movable unit 55 shifted by the movement of the movable unit 55 to generate a projection image.

For example, the movement control unit 12 reciprocally moves the DMD 551 between a first position P1 and a second position P2 distanced with each other less than the distance of the arrangement interval of the plurality of micromirrors of the DMD 551 in the X1-X2 direction and the Y1-Y2 direction with a given cycle. In this configuration, the image control unit 11 controls the DMD 551 to generate a projection image corresponding the position of the movable unit 55 shifted by the movement of the movable unit 55 to generate a projection image, with which the resolution level of the projection image can be set about two times of the resolution level of the DMD 551. Further, the resolution level of the projection image can be set greater than the two times of the resolution level of the DMD 551 by increasing the number of positions used for the movement of the DMD 551.

As above described, when the movement control unit 12 moves or sifts the DMD 551 together with the movable unit 55, the image control unit 11 can generate a projection image corresponding to a sifted position of the DMD 551, with which an image having a resolution level higher than the resolution level of the DMD 551 can be projected.

Further, as to the projector 1 of the above described embodiment, the movement control unit 12 can control the DMD 551 and the movable unit 55 concurrently, which means the movement control unit 12 can rotate the DMD 551 and the movable unit 55 concurrently, with which a projection image can be rotated without reducing a size of the projection image. Conventionally, an image generator (e.g., DMD) is fixed in a projector, in which a size of a projection image is required to be reduced to rotate the projection image while maintaining an aspect ratio of the projection image. By contrast, the DMD 551 can be rotated in the projector 1 of the embodiment. Therefore, a projection image can be rotated without reducing a size of the projection image, and an inclination of the projection image can be adjusted.

As described above, as to the image generation unit 50 of the embodiment, the DMD 551 is provided movably, and an image can be generated with higher resolution by shifting the DMD 551.

Further, in the embodiment, the drive force to move the movable unit 55 acts the heat sink 554, and the interval between the center of gravity position of the movable unit 55 and the drive force generation plane in the Z1-Z2 direction is reduced. Therefore, a swinging of the movable unit 55 like a pendulum can be prevented, and thereby the stability of movement operation of the movable unit 55 can be enhanced. Therefore, the position of the DMD 551 can be controlled with higher precision or accuracy.

Further, in the embodiment, the top plate 511 and the base plate 512, formed of magnetic material, function as the yoke plates and configure the magnetic circuit with the position-detection magnet 541 used for the position detection system, with which the influence of the magnetic field generated by the drive unit to the position detection system is reduced. Therefore, the movement control unit 12 can detect the position of the DMD 551, shifted with a higher speed, with higher precision or accuracy based on the output of the Hall element 542, and can control the position of the DMD 551 with enhanced precision or accuracy.

As above described, the position detection system PS can be applied to a projector or the like. More specifically, in one example case of FIG. 14, the position detection system PS can be implemented or devised, for example, by employing the Hall element 542 and the position-detection magnet 541, and an electronic circuit EC, in which a Hall voltage output from the Hall element 542 can be amplified by the electronic circuit EC. A description is given of the electronic circuit EC with reference to FIG. 15.

FIG. 15A is a schematic configuration of the position detection system PS of the embodiment. As illustrated in FIG. 15A, the position detection system PS includes, for example, a first magnet 541a, and second magnet 541b as the position-detection magnet 541, in which the first magnet 541a and the second magnet 541b are spaced apart by setting an interval between the first magnet 541a and the second magnet 541b, and polarities of the first magnet 541a and the second magnet 541b directed towards the Hall element 542 are set differently to form a magnetic field M by the first magnet 541a and the second magnet 541b. As illustrated in an example case of FIG. 15A, it is assumed that the Hall element 542 is disposed on a movable member such as the movable unit 55. In this example case, it is assumed that the position detection magnet 541 is fixed at a position will respect to the Hall element 542.

Further, as illustrated in FIG. 15A, the position detection system PS includes, for example, the electronic circuit EC, and a controller CTM. The electronic circuit EC performs processing to a detection voltage output by the Hall element 542. For example, the electronic circuit EC performs an analog-digital (AD) conversion to the detection voltage, and performs a detection processing of a position of the movable member such as the movable unit 55. The controller CTM controls, for example, the movement of the movable unit indicated by an arrow DP. For example, the controller CTM can be implemented or devised by using the hardware configuration illustrated in FIG. 2B. Further, the electronic circuit EC and the controller CTM can be configured as one circuit.

As illustrated in FIG. 15A, the position-detection magnet 541 generates the magnetic field M. Specifically, the magnetic field M is generated in an arc shape from the second magnet 541b toward the first magnet 541a. Then, the Hall element 542 detects a vertical component of the magnetic field M effecting the Hall element 542, which is a component of the magnetic field M in the Z-axis direction in FIG. 15A, and outputs a detection voltage corresponding to the magnetic flux density of the magnetic field M effecting the Hall element 542 to the electronic circuit EC as a detection result. Specifically, the detection voltage is, for example, a Hall voltage.

Figure 15B:
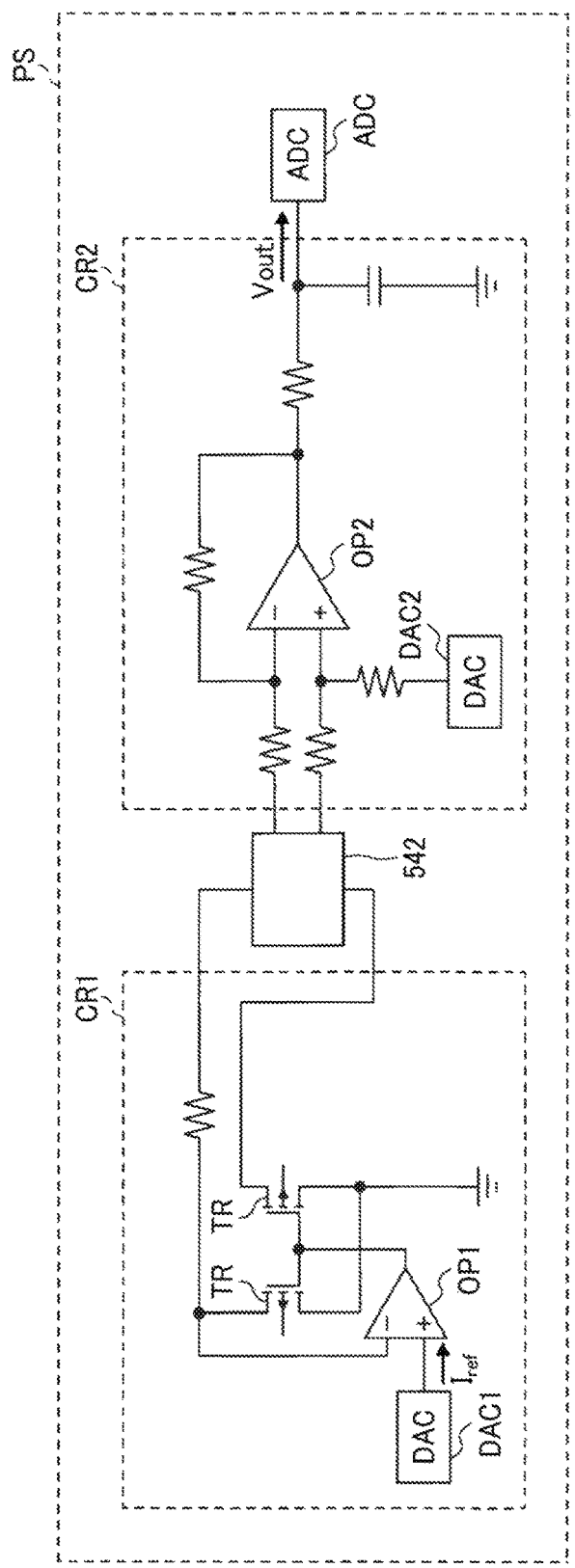
FIG. 15B illustrates an example configuration of an electronic circuit employed for the position detection system of the embodiment.

A description is given of the electronic circuit EC employed for the position detection system PS of the embodiment with reference to FIG. 15B. FIG. 15B illustrates an example configuration of the electronic circuit EC employed for the position detection system PS of the embodiment. As illustrated in FIG. 15B, the electronic circuit EC includes, for example, a constant current circuit CR1, and an operational amplifier circuit CR2. In this configuration, the constant current circuit CR1 adjusts sensitivity of the Hall element 542, and the operational amplifier circuit CR2 amplifies the Hall voltage output from the Hall element 542.

As illustrated in FIG. 15B, the constant current circuit CR1 includes, for example, a first operational amplifier OP1, a transistor TR, and a first digital-analog (DA) converter DAC1, in which a voltage Iref output from the first DA converter DAC1 is processed in the constant current circuit CR1, and then input to the Hall element 542. In this configuration, when the voltage Iref output from the first DA converter DAC1 is changed, the sensitivity of the Hall element 542 can be adjusted, which means when the voltage Iref output from the first DA converter DAC1 is changed, the Hall current to be made to flow in the Hall element 542 can be changed according to the Ohm's law. When the Hall current is changed, the sensitivity of the Hall element 542 can be adjusted.

Further, as illustrated in FIG. 15B, the operational amplifier circuit CR2 includes, for example, a second operational amplifier OP2, and a second digital-analog (DA) converter DAC2. The operational amplifier circuit CR2 amplifies the Hall voltage (hereinafter, "Hall voltage Vh"), which is a detection voltage output from the Hall element 542. Then, the operational amplifier circuit CR2 outputs the amplified Hall voltage Vh to an analog-digital (AD) converter ADC. Then, the AD converter ADC performs an AD conversion to the amplified Hall voltage Vh (i.e., analog signal) to a digital value (i.e., digital signal). Then, a position of a movable member can be detected based on the generated digital value.

In this configuration, when the Hall voltage Vh is amplified, the second DA converter DAC2 can change or adjust a voltage used as a reference for the amplification (hereinafter, reference voltage Vref). Further, the second operational amplifier OP2 can adjust an amplification level by adjusting a gain value. Further, as to the position detection system PS, the Hall voltage Vh can be amplified without using the operational amplifier circuit CR2. Specifically, the position detection system PS can change a current value to be made to flow in the Hall element 542 to output the Hall voltage Vh with a greater value, with which the amplification level of the Hall voltage Vh is changed. Further, the amplification level of the Hall voltage Vh can be changed by changing or adjusting both of the gain value set for the operational amplifier circuit CR2 and the current value to be made to flow in the Hall element 542. Hereinafter, a description is given of a case that the gain value set for the second operational amplifier OP2 is changed or adjusted for changing or adjusting the amplification level of the Hall voltage Vh.

In this example configuration, a voltage output from the second operational amplifier OP2 (i.e., voltage that is input to the AD converter ADC) is referred to as the "output voltage Vout" as illustrated in FIG. 15B. Further, the amplification level that is the gain value set for the second operational amplifier OP2 is referred to as "gain value Am." These values have a relationship expressed by the following formula (1). In this disclosure, the amplification level indicates a level of the amplification such as a higher amplification and lower amplification that can be adjusted by adjusting the gain value.

$$Vout = Vref + Am \times Vh \quad (1)$$

Then, a relationship of the Hall voltage Vh and a detectable position range can be set as described below.

Figure 16:
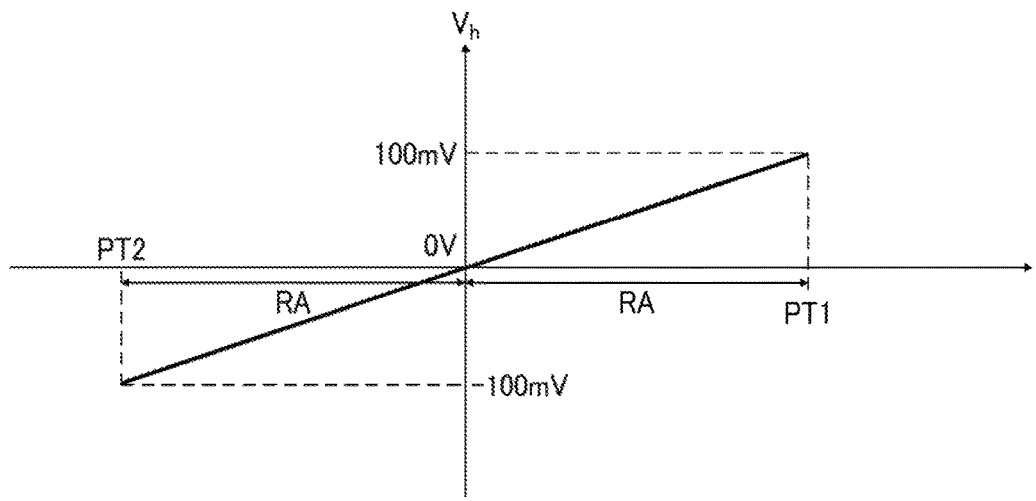
FIG. 16 illustrates an example of a relationship of a Hall voltage and a detectable position range of the embodiment.

FIG. 16 illustrates an example of a relationship of the Hall voltage Vh and the detectable position range of the embodiment. In an example case of FIG. 16, the vertical axis indicates the Hall voltage Vh while the horizontal axis indicates the position.

In an example case of FIG. 16, the position can be detected in a range from a first position PT1 to a second position PT2. Further, a range from the origin point to the first position PT1 and a range from the origin point to the second position PT2 are respectively set as a "range RA." In the example case of FIG. 16, it is assumed that the Hall voltage Vh becomes "100 mV" at the first position PT1, and the Hall voltage Vh becomes "-100 mV" at the second position PT2.

Further, in the example case of FIG. 16, the Hall voltage Vh is a voltage that is not yet amplified by the electronic circuit EC of FIG. 15B.

Then, it is assumed that the "reference voltage Vref=1.5V" and the "gain value Am=30 times" are set. In this case, a relationship of the output voltage Vout and the Hall voltage Vh can be expressed by the following formula (2) based on the above formula (1).

$$Vout = 1.5 + 30 \times Vh \quad (2)$$

Then, if the AD converter ADC performs the AD conversion by converting analog values to digital values with a resolution defined by "B (bit)," the resolution within the above mentioned detectable position range can be expressed by the following formula (3). Further, the detectable position range can be expressed by the following formula (4).

$$\text{Resolution} = 2 \times RA / 2^B \quad (3)$$

$$\text{Detectable position range} = -RA \text{ to } +RA = 2 \times RA \quad (4)$$

Then, a relationship of the output voltage Vout (i.e., voltage obtained by amplifying the Hall voltage Vh) and the detectable position range can be set as described below with reference to FIG. 17.

Figure 17:
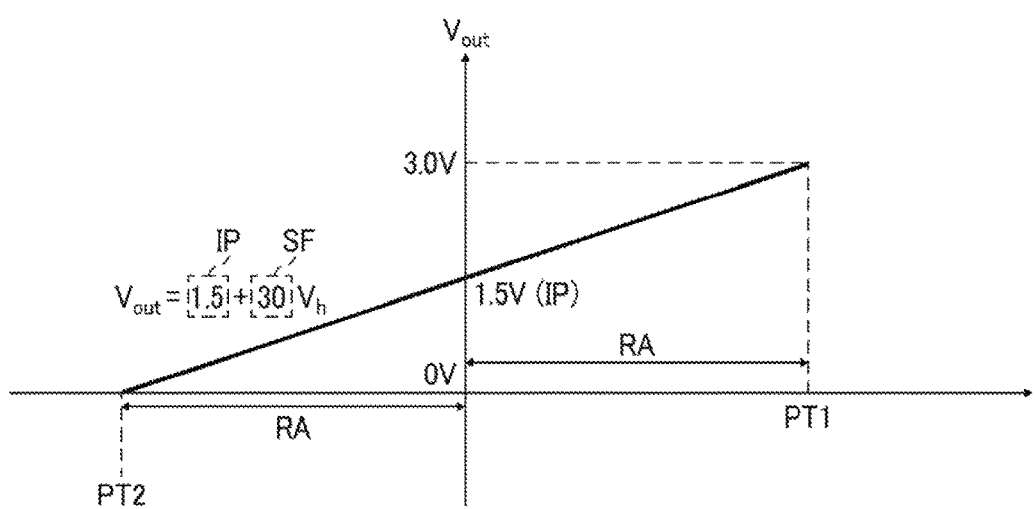
FIG. 17 illustrates an example of a relationship of an output voltage and a detectable position range of the embodiment.

FIG. 17 illustrates an example of a relationship of the output voltage Vout and the detectable position range of the embodiment. In an example case of FIG. 17, the vertical axis indicates the output voltage Vout while the horizontal axis indicates the position as similar to FIG. 16.

As illustrated in FIG. 17, even if the Hall voltage is amplified, the position can be detected from the range of the first position PT1 to the second position PT2, which is same as the detectable position range of FIG. 16. Therefore, in the example case of FIG. 17, the detectable position range can be expressed by the above formula (4).

Further, a slope SF of a profile illustrated in FIG. 17 corresponds to the gain value in the above formula (2), and an intercept IP of the profile illustrated in FIG. 17 corresponds to the reference voltage Vref in the above formula (2).

Then, to enhance the resolution, the gain value (i.e., slope SF in FIG. 17) is increased to, for example, a greater value as described below.

Figure 18:
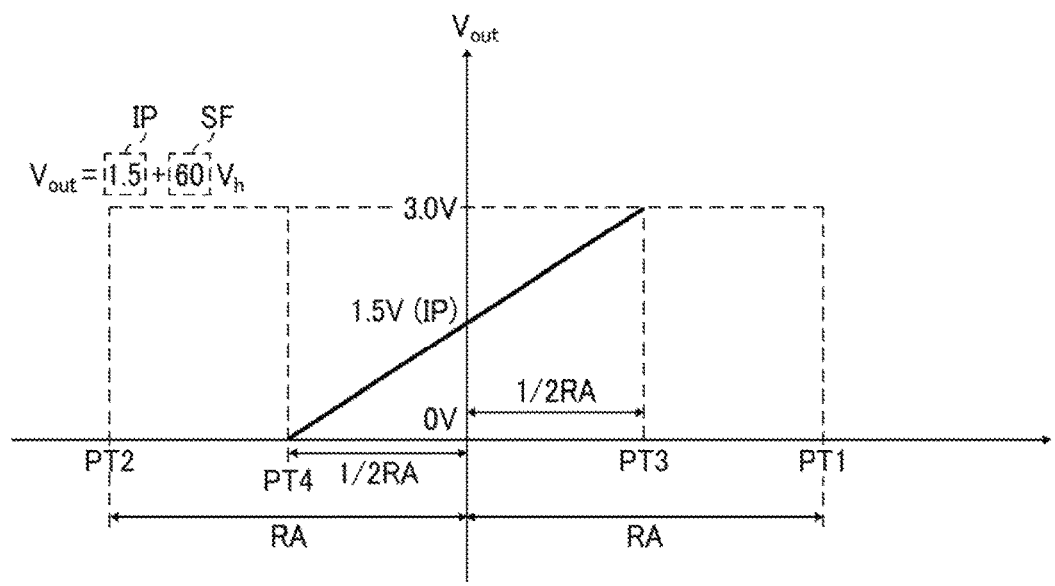
FIG. 18 illustrates another example of a relationship of an output voltage and a detectable position range when an amplification level is changed in the embodiment.

FIG. 18 illustrates another example of a relationship of the output voltage Vout and the detectable position range when the amplification level is changed in the embodiment. Compared to the example case of FIG. 17, the gain value (i.e., slope SF) is set differently in an example case of FIG. 18. Specifically, the gain value of "30" is set for the example case of FIG. 17. By contrast, in the example case of FIG. 18, the gain value is set by multiplying the gain value of FIG. 17 by two times (i.e., 30×2=60 times), which is different from the example case of FIG. 17.

Further, the output voltage Vout can be increased by increasing the current value to be made to flow in the Hall element 542. For example, when the current value to be made to flow in the Hall element 542 is increased for two times, the output voltage Vout can be increased for two times.

For example, when a value of the slope SF is increased to two times of the value used in FIG. 17, the above formula (2) can be changed to the following formula (5).

$$Vout = 1.5 + 60 \times Vh \quad (5)$$

As illustrated in FIG. 18, when the slope SF is changed to a value of the two times of the value used in FIG. 17, the position detection system PS can detect a position in a range from a third position PT3 to a fourth position PT4 with higher precision. When the example case of FIG. 17 and the example case of FIG. 18 are compared, the detectable position range of FIG. 18 becomes a half of the detectable position range of FIG. 17, which means the detectable position range of FIG. 18 becomes smaller than the detectable position range of FIG. 17. Therefore, when the slope SF is increased for two times of the given value as illustrated in FIG. 18, the resolution of the position detection operation and the detectable position range for the example case of FIG. 18 can be respectively expressed by the following formula (6) and formula (7). Further, even in the example case of FIG. 18, the output voltage Vout input to the AD converter ADC (FIG. 15B) is from "0 V" to "3 V."

$$\text{Resolution} = RA / 2^B \quad (6)$$

$$\text{Detectable position range} = -(\tfrac{1}{2})RA \text{ to } +(\tfrac{1}{2})RA = RA \quad (7)$$

When the slope SF is set greater as illustrated in FIG. 18, the slope SF of the profile of FIG. 18 becomes steeper than the slope SF of the profile of FIG. 17. When the example case of FIG. 17 and the example case of FIG. 18 are compared, the resolution level used for the example case of FIG. 18 determined by the above formula (6) becomes higher than the resolution level used for the example case of FIG. 17 determined by the above formula (3). By contrast, the detectable position range used for the example case of FIG. 18 specified by the above formula (7) becomes narrower than the detectable position range used for the example case of FIG. 17 specified by the above formula (4).

In this configuration, one mode that sets a priority on a width of the detectable position range is referred to as a "detection range priority mode," which is indicated in FIG. 17, and another mode that sets a priority on a detection resolution level is referred to as a "resolution priority mode," which is indicated in FIG. 18.

Further, the intercept IP (i.e., reference voltage Vref) is changed from the intercept IP indicated in FIG. 18 to another intercept IP as below described.

Figure 19:
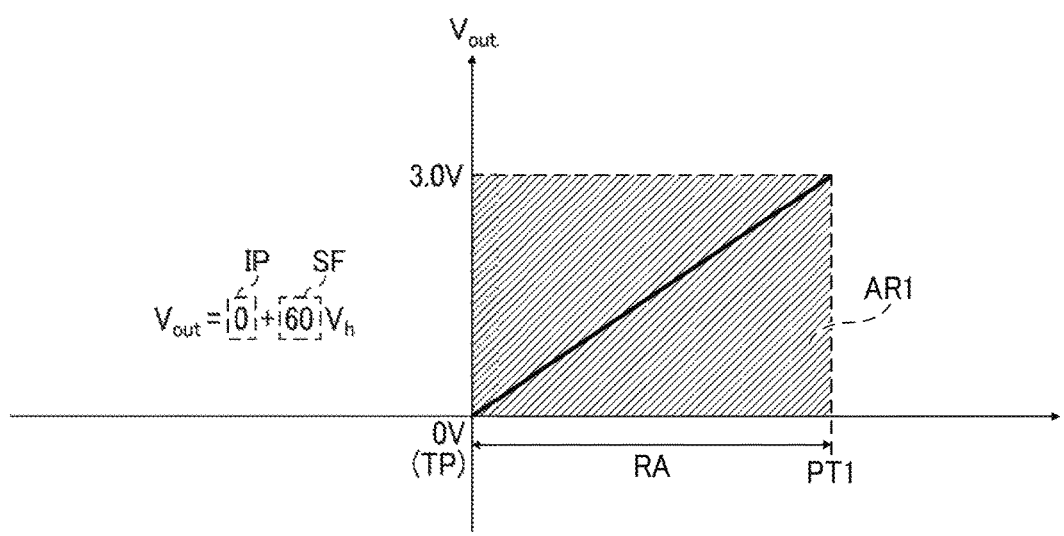
FIG. 19 illustrates one example of a relationship of an output voltage and a detectable position range when an amplification level is changed and a reference voltage is changed in the embodiment.

FIG. 19 illustrates one example of a relationship of the output voltage Vout and the detectable position range when the amplification level is changed and the reference voltage Vref is changed compared to FIG. 17 in the embodiment. The slope SF of "60" is set in an example case of FIG. 19 same as the slope SF of FIG. 18 while the intercept IP of "0" is set in FIG. 19, which is different from FIG. 18.

When the intercept IP of "0" is set as indicated in FIG. 19, the above formula (5) can be changed to the following formula (8).

$$Vout = 0 + 60 \times Vh \quad (8)$$

When the slope SF and the intercept IP are set as illustrated in FIG. 19, the position detection system PS can apply the resolution priority mode, which means the position detection system PS can detect the position with higher precision. Further, the resolution of position detection operation and the detectable position range in the example case of FIG. 19 can be expressed by the following formula (9) and formula (10).

$$Resolution = RA/2^B \quad (9)$$

$$Detectable\ position\ range = 0\ to\ +RA = RA \quad (10)$$

Further, as to the settings of FIG. 19, the output voltage Vout input to the AD converter ADC (FIG. 15B) is from "0V" to "3V."

Further, the intercept IP (i.e., reference voltage Vref) is changed from the intercept IP indicated in FIG. 18 to another intercept IP as described below.

Figure 20:
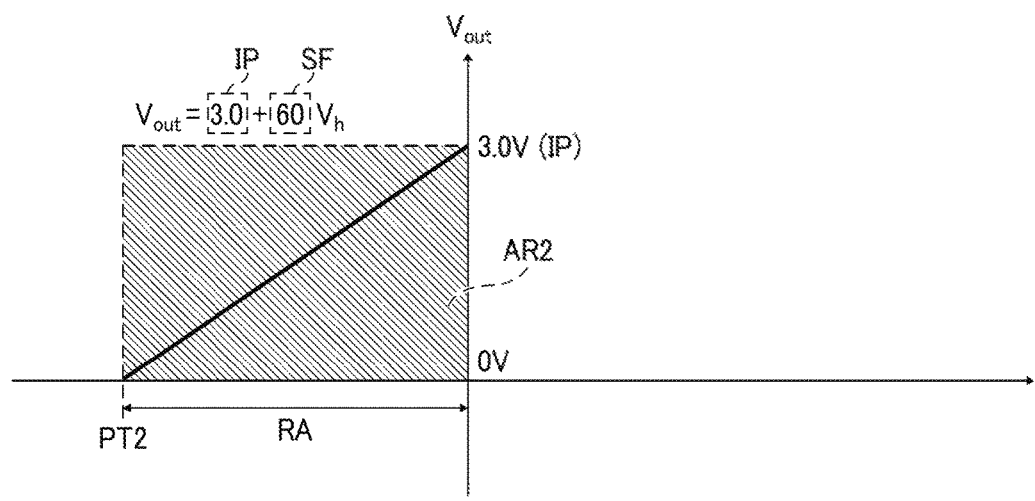
FIG. 20 illustrates another example of a relationship of an output voltage and a detectable position range when an amplification level is changed and a reference voltage is changed in the embodiment.

FIG. 20 illustrates another example of a relationship of the output voltage Vout and the detectable position range when the amplification level is changed and the reference voltage is changed compared to FIG. 17 in the embodiment. The slope SF of "60" is set in an example case of FIG. 20 same as the slope SF of FIG. 19 while the intercept IP of "3.0" is set in FIG. 20, which is different from FIG. 19.

When the intercept IP of "3.0" is set as indicated in FIG. 20, the above formula (8) can be changed to the following formula (11).

$$Vout = 3.0 + 60 \times Vh \quad (11)$$

When the slope SF and the intercept IP are set as illustrated in FIG. 20, the position detection system PS can apply the resolution priority mode, which means the position detection system PS can detect the position with higher precision. Further, the resolution of position detection operation and the detectable position range in the example case of FIG. 20 can be expressed by the following formula (12) and formula (13).

$$Resolution = RA/2^B \quad (12)$$

$$Detectable\ position\ range = -RA\ to\ 0 = RA \quad (13)$$

As above described, when the reference voltage Vref (i.e., intercept IP) is changed, the position detection system PS can switch regions used for detecting the position such as from a first region AR1 (FIG. 19) to a second region AR2 (FIG. 20) or from the second region AR2 (FIG. 20) to the first region AR1 (FIG. 19). Specifically, the position detection system PS can detect the position in the following regions by switching the reference voltage Vref.

Figure 21:
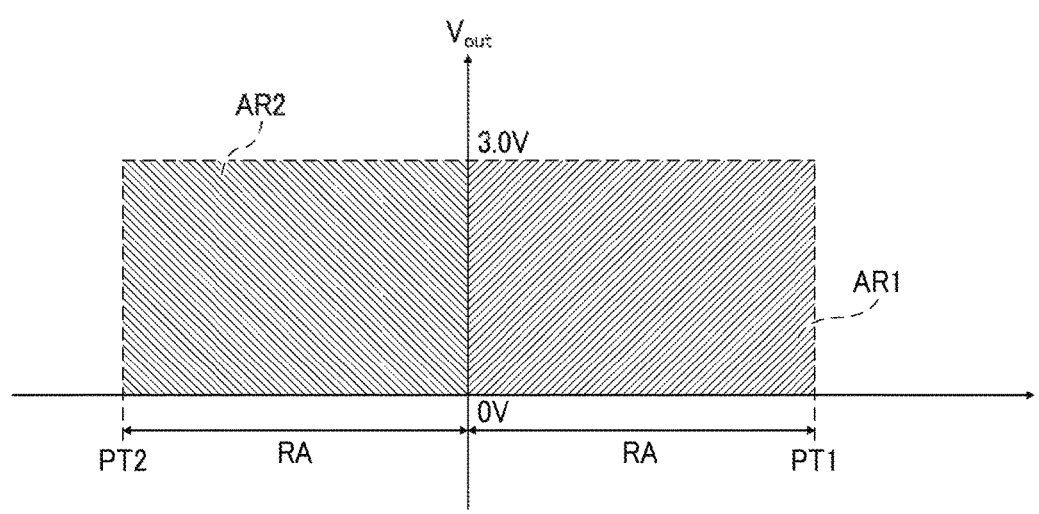
FIG. 21 illustrates one example of regions used as the detectable position range in the embodiment.

FIG. 21 illustrates one example of regions used as the detectable position range in the embodiment. As illustrated in FIG. 21, the position detection system PS can detect the position in the first region AR1 by using the settings of FIG. 19. Further, the position detection system PS can detect the position in the second region AR2 by using the settings of FIG. 20.

Further, when the settings of FIG. 19 and FIG. 20 are used, the slope SF set in FIG. 19 and FIG. 20 is set steeper than the slope SF set in FIG. 17. When the slope SF is set steeper as illustrated in FIG. 19 and FIG. 20, the resolution priority mode is applied. Therefore, compared to the detection range priority mode indicated in FIG. 17, the position detection system PS can detect the position with enhanced precision in the example cases of FIG. 19 and FIG. 20.

Further, the number of switchable regions is not limited to two regions. For example, the number of switchable regions can be three of more depending on the amplification level. For example, when the amplification level is "3 times," the number of switchable regions can be three regions, and when the amplification level is "4 times," the number of switchable regions can be four regions.

Further, even if the amplification level is "2 times," a third region AR3 is preferably set as described below.

Figure 22:
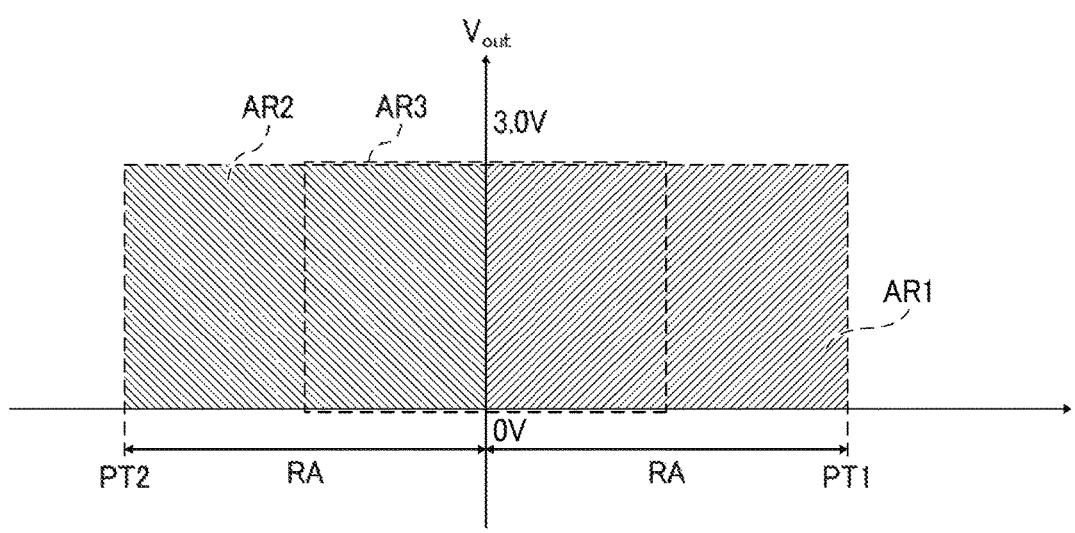
FIG. 22 illustrates another example of regions used as the detectable position range in the embodiment.

FIG. 22 illustrates another example of regions used as the detectable position range in the embodiment. Compared to the example case of FIG. 21, a third region AR3 is further set in addition to the first region AR1 and the second region AR2 in an example case of FIG. 22, which is different from FIG. 21.

The third region AR3 is preferably a region having the center position of the region where a movable member is located with higher probability, wherein the position where the movable member is located with higher probability varies depending on specifications and/or usages. For example, in the example configuration of FIG. 14, the movable member is more likely operated about a point corresponding to a position of "0" as the center of the movement operation, which means that the movable member is located near "0" with higher probability. Therefore, the detectable position of the movable member is located near "0" with higher probability. Therefore, the third region AR is preferably set as the region having the position of "0" as the center position of the region where the movable member is located with higher probability. With this configuration, the position detection system PS is more likely to use the third region AR3.

It is preferable that the number of times of switching of the regions is smaller. If the regions are frequently switched, the position detection precision may be reduced. Therefore, as illustrated in FIG. 22, it is preferable that the more-likely used region such as the third region AR3 is set. When the more-likely used region is set, the position detection system PS can detect the position with enhanced precision. Further, the region (e.g., third region AR3) having the center position where the movable member is located with higher probability can be set for two or more regions.

(Sequence of Changing Amplification Level and Reference Voltage)

Figure 23:
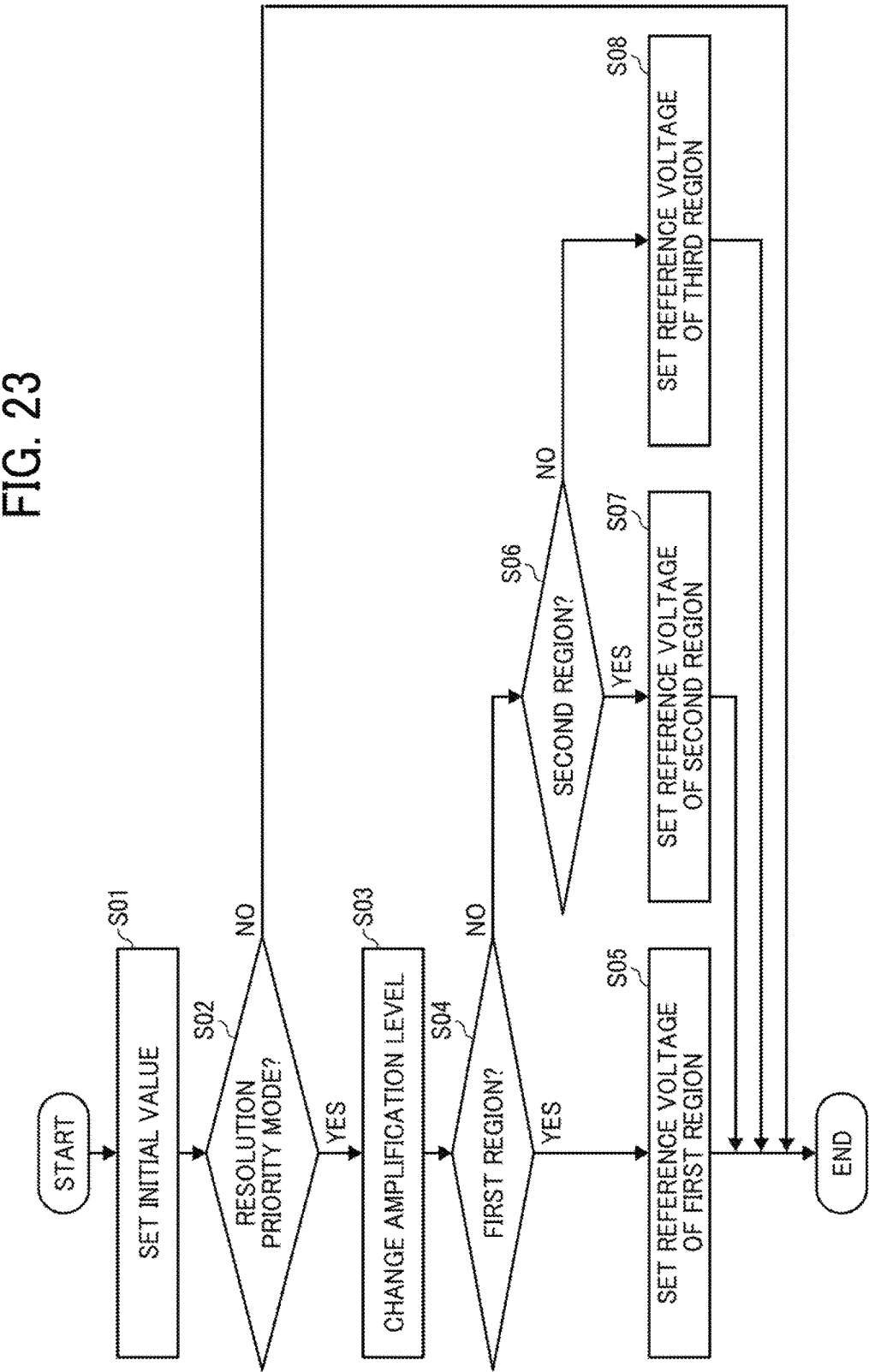
FIG. 23 is a flow chart illustrating the steps of a process of changing an amplification level and a reference voltage in the embodiment.

FIG. 23 is a flow chart illustrating the steps of a process of changing the amplification level and the reference voltage in the embodiment. For example, the position detection system PS performs the following sequence to detect the position.

At step S01, the position detection system PS sets an initial value. For example, the initial value is used to set the detection range priority mode for the position detection system PS. Specifically, when the initial value is set, the position detection system PS is set with the values indicated in FIG. 17.

At step S02, the position detection system PS determines whether the "resolution priority mode" is to be applied. For example, when a user inputs a mode change instruction to the position detection system PS, the position detection system PS changes the "detection range priority mode" to the "resolution priority mode." Therefore, when the user performs a given operation, the position detection system PS determines that the "resolution priority mode" is to be applied.

When the position detection system PS determines that the "resolution priority mode" is to be applied (step S02: YES), the position detection system PS proceeds the sequence to step S03. By contrast, when the position detection system PS determines that the "resolution priority mode" is not applied (step S02: NO), the position detection system PS ends the sequence.

At step S03, the position detection system PS changes the amplification level. For example, the position detection system PS changes or adjusts at least one of the current value to be made to flow in the Hall element 542 and the gain value set for the operational amplifier to change the amplification level of the Hall voltage Vh. For example, when the amplification level is changed for "2 times," the slope SF is changed as indicated from FIG. 17 to FIG. 18.

Then, the position detection system PS determines a region to be used for detecting the position. In the sequence illustrated in FIG. 23, the position detection system PS determines the region to be used for detecting the position at step S04 and step S06. For example, when the three regions illustrated in FIG. 22 are set for the position detection system PS, a region where the Hall element 542 is located is set for the position detection system PS. For example, when the Hall element 542 is located near a position of "0," the third region AR3 is set as a to-be-used region.

At step S04, the position detection system PS determines whether the to-be-used region is the first region AR1. For example, as above described, when the Hall element 542 is located near "0" and the third region AR3 is the to-be-used region, the position detection system PS determines that the to-be-used region is not the first region AR1 (step S04: NO).

When the position detection system PS determines that the to-be-used region is the first region AR1 (step S04: YES), the position detection system PS proceeds the sequence to step S05. By contrast, when the position detection system PS determines that the to-be-used region is not the first region AR1 (step S04: NO), the position detection system PS proceeds the sequence to step S06.

At step S05, the position detection system PS sets a reference voltage Vref of the first region AR1. For example, as illustrated in the example case of FIG. 19, the position detection system PS is set with one reference voltage Vref such that the intercept IP becomes "0."

At step S06, the position detection system PS determines whether the to-be-used region is the second region AR2. For example, as above described, when the Hall element 542 is located near "0" and the third region AR3 is the to-be-used region, the position detection system PS determines that the to-be-used region is not the second region AR2 (step S06: NO).

When the position detection system PS determines that the to-be-used region is the second region AR2 (step S06: YES), the position detection system PS proceeds the sequence to step S07. By contrast, when the position detection system PS determines that the to-be-used region is not the second region AR2 (step S06: NO), the position detection system PS proceeds the sequence to step S08.

At step S07, the position detection system PS sets a reference voltage Vref of the second region AR2. For example, as illustrated in the example case of FIG. 20, the position detection system PS is set with one reference voltage Vref such that the intercept IP becomes "3.0."

At step S08, the position detection system PS sets a reference voltage Vref of the third region AR3. For example, as illustrated in the example case of FIG. 18, the position detection system PS is set with one reference voltage Vref such that the intercept IP becomes "1.5."

(Functional Configuration)

Figure 24:
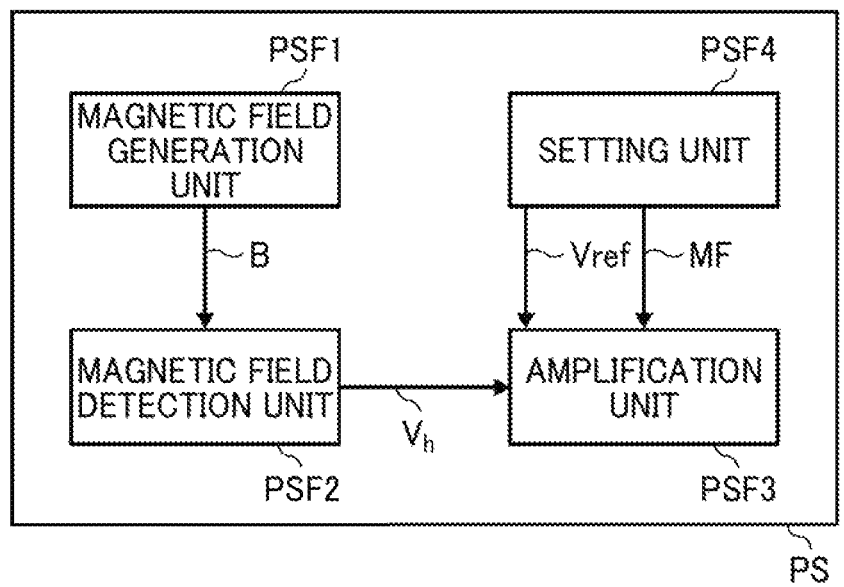
FIG. 24 is an example of a functional block diagram of the position detection system of the embodiment.

FIG. 24 is an example of a functional block diagram of the position detection system PS of the embodiment. As illustrated in FIG. 24, the position detection system PS includes, for example, a magnetic field generation unit PSF1, a magnetic field detection unit PSF2, an amplification unit PSF3, and a setting unit PSF4.

The magnetic field generation unit PSF1 generates the magnetic field M (FIG. 15A). For example, the magnetic field generation unit PSF1 can be implemented or devised by the position-detection magnet 541 (FIG. 14).

When the magnetic field M (FIG. 15A) is generated by the magnetic field generation unit PSF1, the magnetic field detection unit PSF2 detects a magnetic flux density B of the magnetic field M effecting the magnetic field detection unit PSF2, and outputs the Hall voltage Vh corresponding to the magnetic flux B density of the magnetic field M effecting the magnetic field detection unit PSF2. For example, the magnetic field detection unit PSF2 can be implemented or devised by the Hall element 542 (FIG. 14).

The amplification unit PSF3 amplifies the Hall voltage Vh output from the magnetic field detection unit PSF2. For example, the amplification unit PSF3 can be implemented or devised as an amplification circuit by the operational amplifier circuit CR2 (FIG. 15B).

The setting unit PSF4 sets the reference voltage Vref and the amplification level MF to the amplification unit PSF3. Further, the setting unit PSF4 changes the reference voltage Vref to switch a region used for detecting the position. For example, the setting unit PSF4 can be implemented or devised by the constant current circuit CR1 (FIG. 15B) and the operational amplifier circuit CR2 (FIG. 15B).

As above described, the position detection system PS can detect the position of the movable member based on the detection voltage detected by the magnetic field detection unit PSF2 when the magnetic field detection unit PSF2 detects the magnetic flux density B of the magnetic field M effecting the magnetic field detection unit PSF2 from the magnetic field generation unit PSF1. Then, the position detection system PS can amplify the detection voltage by using the amplification unit PSF3.

As illustrated in the example case of FIG. 18, when the amplification level MF is set higher to set a higher resolution, the detectable position range becomes narrower. Therefore, the position detection system PS switches between a plurality of regions as illustrated in the example case of FIG. 21 when detecting the position of the movable member. Further, the position detection system PS can switch the regions by changing the reference voltage Vref by using the setting unit PSF4. With this configuration, the position detection system PS can detect the position of the movable member with higher resolution in each of regions illustrated in the example cases of FIG. 19 and FIG. 20.

Further, by switching the regions as above described, the position detection system PS can use the detectable position range of "2×RA" used in the example case of FIG. 17 as the detectable position range for the example case of FIG. 21, with which the position detection system PS can detect the position with a wider range.

In the above described configuration, the above described formula (1) is used in the embodiment.

$$Vout = Vref + Am \times Vh \quad (1)$$

In the above described configuration, when the reference voltage Vref alone is changed or adjusted (i.e., gain value Am is not changed), the region to be used for the position detection operation is changed (i.e., the center position of the to-be-used region is changed) while the resolution and a width of the detectable position range are not changed as indicated in the example cases of FIGS. 18, 19, and 20.

Further, when the gain value Am alone is changed or adjusted (i.e., reference voltage Vref is not changed), the width of the detectable position range and the resolution are changed. For example, when the gain value Am alone is increased, the width of the detectable position range is set narrower without changing the center position of the to-be-used region, and thereby the resolution can be set higher as indicated by comparing the example cases of FIGS. 17 and 18.

In the above described configuration, when the resolution is set higher by setting the gain value Am with a greater value, the width of the detectable position range is set narrower. Therefore, after the resolution is set higher, the to-be-used region (i.e., the center position of the to-be-used region) can be shifted by changing or adjusting the reference voltage Vref, with which the detectable position range can be set wider for the position detection system PS of the embodiment, and thereby the position detection system PS can detect the position of the movable member with higher resolution and the wider detectable position range. Therefore, in the embodiment, each one of the reference voltage Vref and the gain value Am is changed or adjusted in view of the width of the detectable position range and the resolution to be used for the position detection operation.

According to the above described embodiment of the present invention, the position detection system can detect a position of the movable member with enhanced resolution and a wider detection range.

Further, although the position detection system PS is applied to the projector in the above described embodiment, the position detection system PS can be applied to other devices or apparatuses other than the projector.

Numerous additional modifications and variations for the modules, the units, the image generation units, the image projection apparatuses, and the apparatuses are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A position detection system for detecting a position of a movable member, comprising:
    a magnetic field generation unit to generate a magnetic field;
    a magnetic field detection unit to detect a magnetic flux density of the magnetic field effecting the magnetic field detection unit from the magnetic field generation unit, the magnetic flux density of the magnetic field effecting the magnetic field detection unit changeable depending on a change of a position of the magnetic field detection unit relative to a position of the magnetic field generation unit, and to output a detection voltage corresponding to the magnetic flux density of the magnetic field detected by the magnetic field detection unit, the magnetic field detection unit disposed on the movable member; and
    circuitry to
        amplify the detection voltage,
        set a reference voltage to be used as a reference for amplifying the detection voltage, and an amplification level of the detection voltage based on at least one of a voltage input to the magnetic field detection unit and a gain value set for the amplification of the detection voltage or both of the voltage input to the magnetic field detection unit and the gain value set for the amplification of the detection voltage, and
        change the reference voltage to switch a region used for detecting the position of the movable member,
    wherein a fixed unit supports the movable member,
    wherein the magnetic field generation unit is disposed in the fixed unit, and
    wherein the magnetic field detection unit is disposed in the movable member.

2. The position detection system of claim 1, wherein the magnetic field detection unit includes a Hall element, and the circuitry adjusts a current value to be made to flow in the Hall element to set the amplification level of the detection voltage.

3. The position detection system of claim 1, wherein the circuitry includes an operational amplifier circuit as an amplification circuit, and the circuitry adjusts the gain value set for the operational amplifier circuit to set the amplification level of the detection voltage.

4. The position detection system of claim 1, wherein a region including the center position where the movable member locating with higher probability is set as the region used for detecting the position of the movable member.

5. An image generation unit comprising:
    the position detection system of claim 1; and an image generation element to receive light and to generate an image based on the received light.

6. An image projection apparatus comprising:
the image generation unit of claim 5;
a light source to emit light to the image generation element; and
a projection unit to project the image generated by the image generation element.

7. The position detection system of claim 1, wherein the fixed unit includes a top plate and a base plate provided in parallel with other with a space provided therebetween,
wherein the movable member is disposed in the space, and
wherein the movable member supports a digital micromirror device (DMD) including an image generation plane where a plurality of movable micromirrors are arranged in a lattice pattern.

8. A method of detecting a position of a movable member by using a magnetic field generation unit to generate a magnetic field, a magnetic field detection unit disposed on the movable member, the method comprising:
detecting a magnetic flux density of the magnetic field effecting the magnetic field detection unit from the magnetic field generation unit;
outputting a detection voltage corresponding to the magnetic flux density of the magnetic field detected by the magnetic field detection unit, the magnetic flux density of the magnetic field effecting the magnetic field detection unit changeable depending on a change of a position of the magnetic field detection unit relative to a position of the magnetic field generation unit;
amplifying the detection voltage;
setting a reference voltage to be used as a reference for amplifying the detection voltage;
setting an amplification level of the detection voltage based on at least one of a voltage input to the magnetic field detection unit and a gain value set for the amplification of the detection voltage or both of the voltage input to the magnetic field detection unit and the gain value set for the amplification of the detection voltage; and
changing the reference voltage to switch a region used for detecting the position of the movable member,
wherein a fixed unit supports the movable member,
wherein the magnetic field generation unit is disposed in the fixed unit, and
wherein the magnetic field detection unit is disposed in the movable member.

9. The method of claim 8, wherein the fixed unit includes a top plate and a base plate provided in parallel with other with a space provided therebetween,
wherein the movable member is disposed in the space, and
wherein the movable member supports a digital micromirror device (DMD) including an image generation plane where a plurality of movable micromirrors are arranged in a lattice pattern.

* * * * *